United States Patent
Takenaka et al.

(10) Patent No.: US 7,664,572 B2
(45) Date of Patent: Feb. 16, 2010

(54) CONTROL DEVICE OF LEGGED MOBILE ROBOT

(75) Inventors: Toru Takenaka, Wako (JP); Takashi Matsumoto, Wako (JP); Takahide Yoshiike, Wako (JP); Kazushi Akimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 946 days.

(21) Appl. No.: 10/512,231

(22) PCT Filed: Apr. 28, 2003

(86) PCT No.: PCT/JP03/05446

§ 371 (c)(1),
(2), (4) Date: Oct. 22, 2004

(87) PCT Pub. No.: WO03/090978

PCT Pub. Date: Nov. 6, 2003

(65) Prior Publication Data

US 2006/0106495 A1 May 18, 2006

(30) Foreign Application Priority Data

Apr. 26, 2002 (JP) ............................... 2002-127684

(51) Int. Cl.
*G05B 19/18* (2006.01)
*G06F 19/00* (2006.01)
*G05B 19/408* (2006.01)

(52) U.S. Cl. ..................... 700/253; 700/245; 700/250; 901/50; 318/568.12; 318/568.2; 318/568.23

(58) Field of Classification Search .................. 700/245, 700/250, 253, 254; 318/568.12, 568.16, 318/568.23, 568.2
See application file for complete search history.

(56) References Cited

U.S. PATENT DOCUMENTS

| 5,459,659 A | 10/1995 | Takenaka |
| 5,974,366 A | 10/1999 | Kawai et al. |
| 2005/0085948 A1* | 4/2005 | Herr et al. ................... 700/258 |

FOREIGN PATENT DOCUMENTS

| EP | 1 018 467 | 7/2000 |
| JP | 05-318339 | 12/1993 |
| JP | 05-324115 | 12/1993 |
| JP | 06-031658 | 2/1994 |
| JP | 10-086080 | 4/1998 |
| JP | 10-230485 | 9/1998 |
| JP | 10-277969 | 10/1998 |
| JP | 11-300661 | 11/1999 |
| JP | 2002-086373 | 3/2002 |
| JP | 2002-326173 | 11/2002 |

OTHER PUBLICATIONS

Ahmadi et al., "Preliminary Experiments with an Actively Tuned Passive Dynamic Running Robot", Springer-Verlag, "Experimental Robotics V", 1998, p. 249-260.*

(Continued)

*Primary Examiner*—Thomas G Black
*Assistant Examiner*—Christine M Behncke
(74) *Attorney, Agent, or Firm*—Rankin, Hill & Clark LLP

(57) ABSTRACT

A control device of a legged mobile robot, wherein a state amount error (for example, an error of a vertical position of a body 3), which is a difference between an actual state amount and a state amount of a desired gait related to a translational motion in a predetermined direction (for example, a translational motion in a vertical direction) of a legged mobile robot 1, is determined, and then a desired motion of the desired gait is determined such that the state amount error approaches zero. The desired motion is determined using a dynamic model by additionally inputting a virtual external force determined on the basis of the state amount error to the dynamic model for generating desired gaits. At the same time, a desired floor reaction force of the robot 1 is corrected on the basis of a state amount error of zero, and compliance control is carried out to make the motion and the floor reaction force of the robot 1 follow the desired motion and the desired floor reaction force of the desired gait.

29 Claims, 18 Drawing Sheets

OTHER PUBLICATIONS

WO 03/057425 A1, Gait Producing Device for Leg Type Movable Robot, and Control Device, Publication Date: Jul. 17, 2003.
WO 03/090980 A1, Self-Position Estimating Device for Leg Type Movable Robots, Publication Date: Nov. 6, 2003.
WO 03/061917 A1, Controller of Legged Mobile Robot, Publication Date: Jul. 31, 2003.
WO 02/40224 A1, Gait Pattern Generating Device for Legged Mobile Robot, Publication Date: May 23, 2002.
Proceedings of the 2002 IEEE International Conference on Robotics & Automation, Washington DC, May 2002, "Development of a Biologically Inspired Hopping Robot—Kenken", S.H. Hyon, T. Mita, pp. 3984-3991.

* cited by examiner

FLOOR REACTION FORCE VERTICAL COMPONENT

X COMPONENT OF DESIRED ZMP

MAX. PERMISSIBLE VALUE OF Fcmpnz

MIN. PERMISSIBLE VALUE OF Fcmpnz

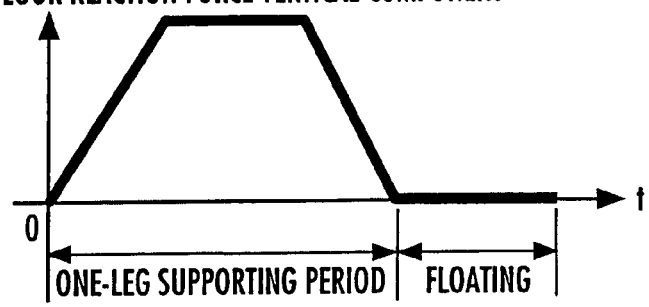
FIG.14 (a)
FLOOR REACTION FORCE VERTICAL COMPONENT
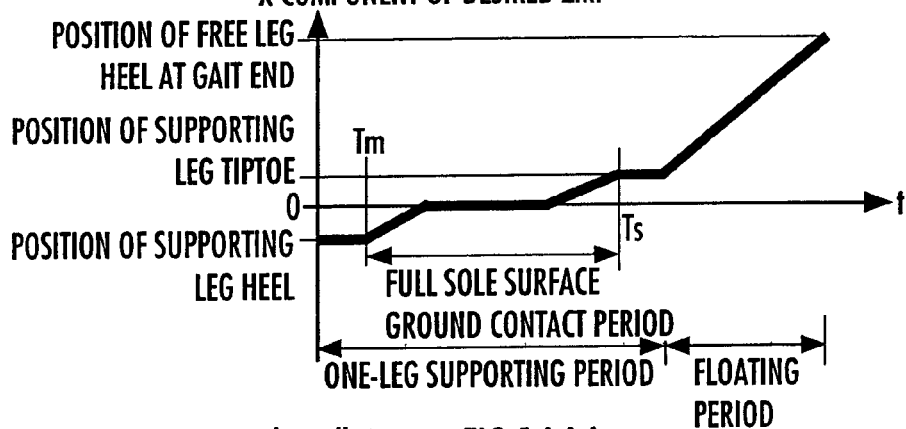
FIG.14 (b)
X COMPONENT OF DESIRED ZMP
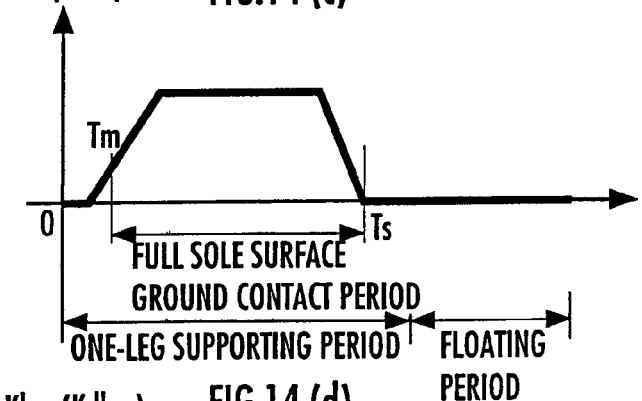
Khc (Kdhc)  FIG.14 (c)
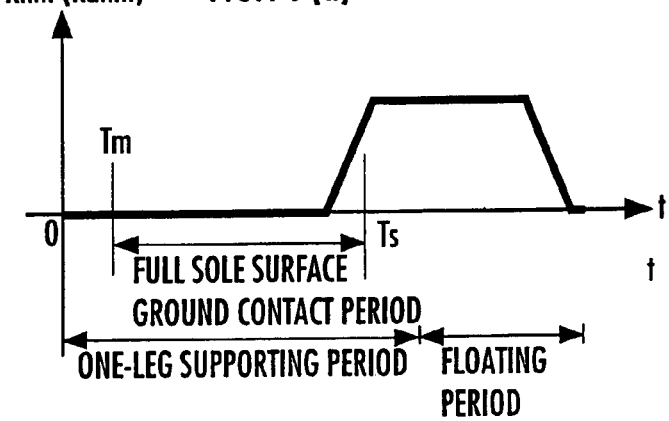
Khm (Kdhm)  FIG.14 (d)

FIG. 16

ENTRY

| DETERMINE DESIRED FLOOR REACTION FORCE VERTICAL COMPONENT AT TIME t ON THE BASIS OF GAIT PARAMETERS. | S900 |

| DETERMINE DESIRED ZMP AT TIME t ON THE BASIS OF GAIT PARAMETERS. | S902 |

| DETERMINE DESIRED POSITIONS/POSTURES OF BOTH FEET, REFERENCE BODY POSTURE, AND DESIRED ARM POSTURES AT TIME t ON THE BASIS OF GAIT PARAMETERS. | S904 |

| CALCULATE TOTAL VERTICAL CENTER-OF-GRAVITY POSITION THAT DYNAMICALLY BALANCES WITH RESULTANT FORCE OF DESIRED FLOOR REACTION FORCE VERTICAL COMPONENT AND MODEL VERTICAL EXTERNAL FORCE Fmdlz. | S906 |

| CALCULATE VERTICAL BODY POSITION THAT SATISFIES TOTAL VERTICAL CENTER-OF-GRAVITY POSITION. | S908 |

| DETERMINE PERMISSIBLE RANGE OF FLOOR REACTION FORCE HORIZONTAL COMPONENT [Fxmin, Fxmax] AT TIME t ON THE BASIS OF GAIT PARAMETERS. | S910 |

| DETERMINE PERMISSIBLE RANGE OF FLOOR REACTION FORCE MOMENT AT TIME t ON THE BASIS OF GAIT PARAMETERS. | S911 |

| DETERMINE HORIZONTAL BODY ACCELERATION AND BODY POSTURE ANGULAR ACCELERATION OF CURRENT TIME GAIT SUCH THAT MODEL MANIPULATION FLOOR REACTION FORCE MOMENT IS GENERATED ABOUT DESIRED ZMP, AND THAT FLOOR REACTION FORCE HORIZONTAL COMPONENT Fx DOES NOT EXCEED [Fxmin, Fxmax]. | S912 |

| INTEGRATE HORIZONTAL BODY ACCELERATION AND BODY POSTURE ANGULAR ACCELERATION TO CALCULATE HORIZONTAL BODY VELOCITY AND BODY POSTURE ANGULAR VELOCITY. THE CALCULATION RESULT IS FURTHER INTEGRATED TO DETERMINE HORIZONTAL BODY POSITION AND BODY POSTURE ANGLE. | S914 |

RETURN

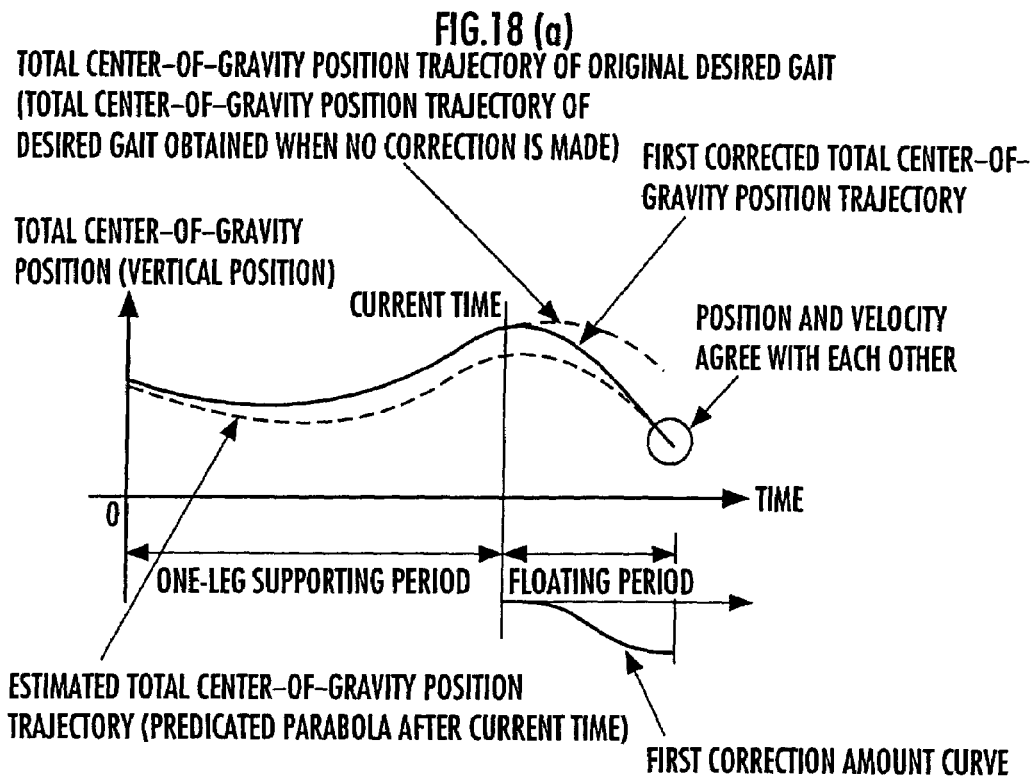
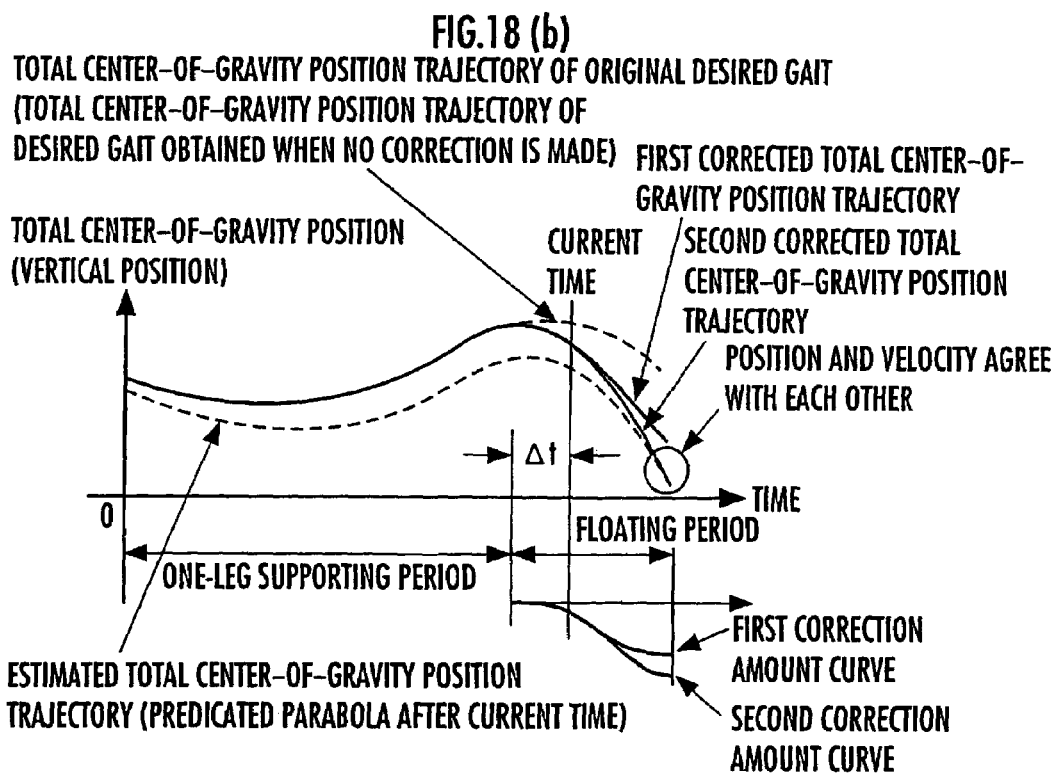

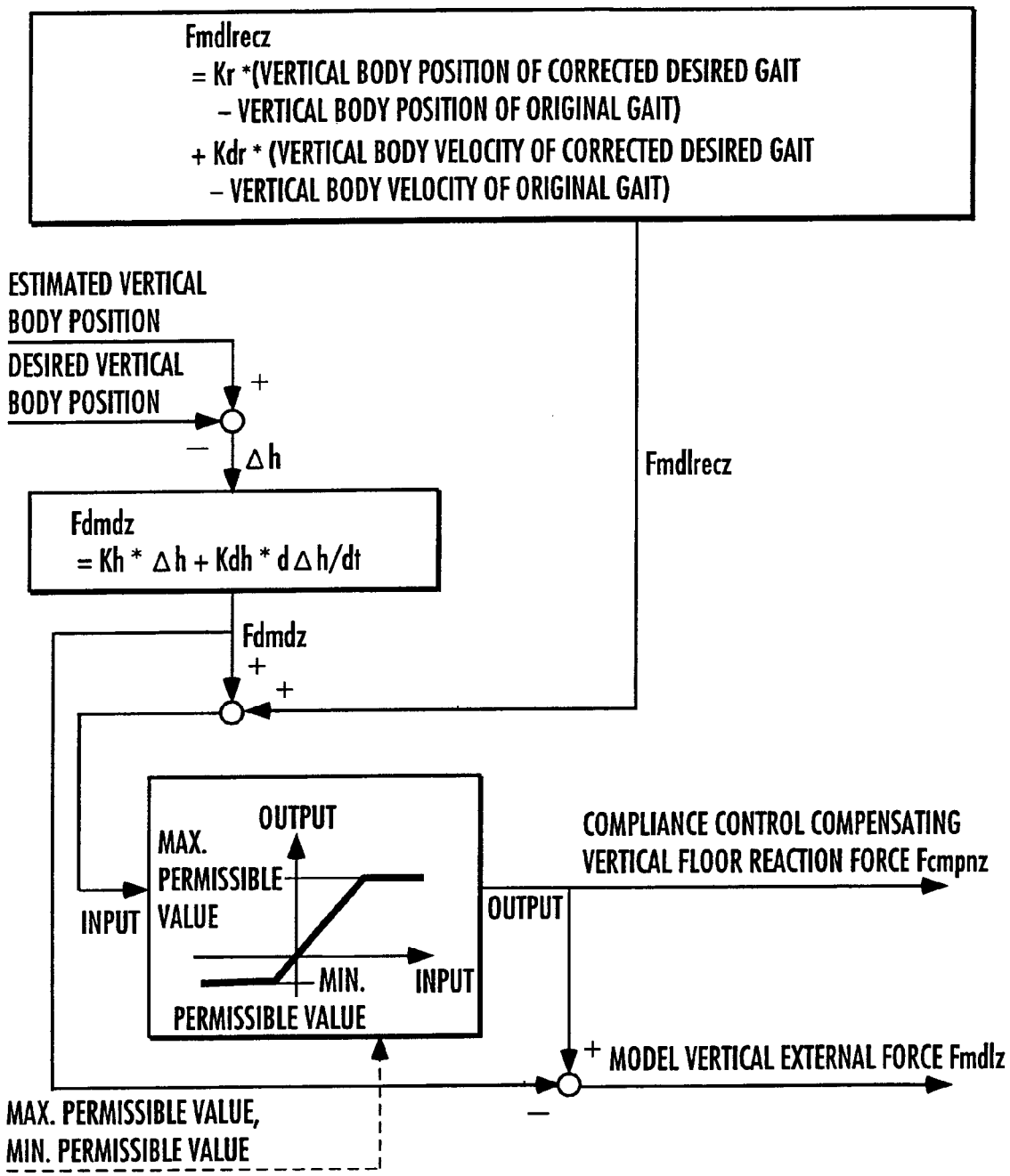

CONTROL DEVICE OF LEGGED MOBILE ROBOT

TECHNICAL FIELD

The present invention relates to a control device of a legged mobile robot.

BACKGROUND ART

Hitherto, in a legged mobile robot, e.g., a bipedal mobile robot, the robot is mainly adapted to perform walking. In recent years, however, as the development of legged mobile robots advances, it has come to be desired that the robot also run at a faster speed or jump rather than performing only walking.

When a robot is walking, it supports its own weight by having one of its legs in contact with the ground. If the robot is to run or jump, there will be a period in which a floor reaction force acting on the robot becomes zero or nearly zero. Accordingly, for the robot to run or jump, it will be important to control also the floor reaction force acting on the robot, especially a vertical component of a translational force.

Accordingly, the present applicant has proposed, in previously submitted PCT application No. PCT/JP02/13596, etc., a control device for achieving running or the like by generating a desired motion pattern based on a dynamic model of a robot while explicitly designing a desired ZMP pattern and a desired floor reaction force vertical component (the vertical component of a translational force, which will apply hereinafter) pattern and by carrying out control so as to cause a vertical component of an actual floor reaction force to follow a desired floor reaction force vertical component pattern by compliance control while making an actual robot follow the desired motion pattern.

In the above PCT application No. PCT/JP02/13596, compliance control for controlling floor reaction force vertical components proposed in Japanese Patent Laid Open Application No. 11-300661 is used. In the compliance control, a distal end (foot) of a leg is displaced in the vertical direction with respect to a body of a robot(shifted from the position of the distal end of the leg of a desired gait) on the basis of an actual floor reaction force vertical component. This will be hereinafter referred to as vertical compliance control.

There has been a tendency in which, if the vertical compliance control is not used, then a kicking force at a jump is significantly influenced by the hardness of a floor. For instance, there have been cases where an appropriate jumping force is obtained on a hard floor, whereas an insufficient jumping force results on a carpet. There have also been cases where it is difficult for generated characteristic vibrations to attenuate, depending on flexure rigidity of a floor, the rigidity of a robot, and the mass of a robot. Especially in the case of a floor made of an iron plate or the like with low attenuation property, characteristic vibrations do not attenuate for a long time, and contact with the ground is impaired, causing slippage.

However, if the vertical compliance control is used to eliminate the inconvenience, then the actual vertical position of the robot body (hereinafter referred to as the actual vertical position of the body) will be easily shifted from a desired vertical position of the body, frequently causing a shifted timing of leaving a floor at a jump. For instance, if the actual vertical position of the body is lower than a desired vertical position of the body at desired floor leaving time, then the vertical component of a floor reaction force does not reach zero when the desired floor leaving time is reached, resulting in a delayed floor leaving timing.

Conversely, if the actual vertical position of the body is higher than a desired vertical position of the body at a desired floor leaving time, then the vertical component of a floor reaction force reaches zero before the desired floor leaving time, resulting in an advanced floor leaving timing. Complementarily, if the vertical compliance control is not used, then the actual vertical position of the body substantially coincides with a desired vertical position of the body, making it difficult for a floor leaving timing to be disturbed.

If the floor leaving timing is advanced as described above, then a frictional force in a horizontal direction decreases or becomes zero earlier than estimated, so that slippage or spin has frequently taken place.

Conversely, if the floor leaving timing is delayed, then there has been a danger of a free foot being caught on a floor before the free foot is moved forward immediately after leaving the floor when running.

Furthermore, if a trajectory of the vertical position of the body of an actual robot (the trajectory of center of gravity) deviates from a desired trajectory of the vertical position of the body when leaving a floor, then the trajectory of the center of gravity deviates also when landing, causing the landing timing to be disturbed. Hence, there has been a danger in that an excessive ground speed results when a free leg foot lands, generating a large landing impact.

Furthermore, deviation of the motion and a floor reaction force of the actual robot from those of a desired gait has led to deteriorated posture stability.

The present invention has been made in view of the aforesaid background, and it is an object thereof to provide a control device of a legged mobile robot that makes it possible to bring a trajectory of a leg distal portion (foot) of a robot relative to a floor close to the trajectory of a leg distal portion (foot) of a desired gait, to ensure the robot to leave a floor at a floor leaving timing according to the desired gait so as to prevent the robot from slipping or spinning or a free leg from being caught on a floor, and to reduce landing impacts.

DISCLOSURE OF INVENTION

According to a first invention of a legged mobile robot in accordance with the present invention, there is provided a control device of a legged mobile robot adapted to generate a desired gait of a legged mobile robot that moves by motions of its legs and to control an operation of the robot so as to follow the desired gait, comprising desired gait generating means for generating a desired gait including at least a desired motion of the robot, and state amount error calculating means for determining, as a state amount error, a difference between a state amount of the desired gait related to a translational motion in a predetermined direction of the robot and an actual state amount of the robot related to the translational motion in the predetermined direction, wherein the desired gait generating means determines a desired motion of a desired gait of the robot so as to bring the state amount error close to zero on the basis of the state amount error.

According to the first invention, a desired motion of a desired gait of the robot is determined such that the state amount error related to the translational motion in the predetermined direction is brought close to zero. This arrangement improves agreement between a state amount of an actual robot and a state amount in a desired gait related to the above translational motion. As a result, it is possible to match the timing of an actual operation with an operation timing in a desired gait related to a translational motion in the predetermined direction of the robot, thus permitting smooth motions of the robot.

The predetermined direction may be, for example, a vertical direction or a direction in which the center of gravity of the robot and a desired ZMP of a desired gait are connected. This will apply to any one of the following inventions to be explained.

As in the twenty-first invention and the twenty-second invention to be discussed hereinafter, preferably, the state amount is, for example, the position of a predetermined part of the robot or the position of the center of gravity of the robot. In particular, the predetermined part is preferably a body (the base from which legs are extendedly provided) of the robot. This will apply to any one of the inventions to be explained hereinafter. A desired motion of a desired gait is determined to bring a state amount error (i.e., positional error) related to the position of the body or the position of the center of gravity of the robot close to zero, making it possible to bring also an actual trajectory of a distal portion (foot) of a leg close to a trajectory of the desired gait. This allows the timings of operations, such as leaving the leg from a floor or landing the leg onto a floor, to match desired timings (timings on desired gaits). As a result, it is possible to prevent slippage or spin, a distal portion of a leg from being caught on a floor, or an undue landing impacts from being produced at the time of landing.

In the aforesaid first invention, if the desired gait is a gait having a floating period in which all legs of the robot float in the air, that is, if the robot runs or jumps, then a preferred form comprises self position estimating means for taking, for example, the position of a predetermined part of the robot or the position of the center of gravity of the robot as a representative self position of the robot, and then estimating a component in the predetermined direction of the representative self position as indicative of an actual state amount of the robot related to a translational motion in the predetermined direction, and predicted trajectory calculating means for determining at least a predicted trajectory of a component in a predetermined direction of the representative self position in the floating period on the basis of a component of in a predetermined direction of the representative self position that has been estimated by the self position estimating means at least by a start of the floating period, wherein the desired gait generating means determines a desired motion of the desired gait in the floating period on the basis of the state amount error, which is the difference between the component in a predetermined direction of the estimated representative self position and the component in a predetermined direction of the representative self position of the desired gait such that a desired trajectory of the component in a predetermined direction of the representative self position defined by the desired gait in the floating period approaches the predicted trajectory at least before an end of the floating period (second invention).

According to the second invention, a predicted trajectory of a component in a predetermined direction of a representative self position of a robot in a floating period is determined, and a desired motion of a desired gait is determined so that a desired trajectory of the component in a predetermined direction (vertical direction or the like) of a representative self position in a desired gait approaches the predicted trajectory at least by an end of a floating period. As a result, when the floating period ends, that is, when the robot lands, a difference (state amount error) between a component in a predetermined direction of an actual representative self position and a component in a predetermined direction of a representative self position in a desired gait can be reduced, allowing an actual landing timing to match a landing timing on the desired gait. This makes it possible to achieve a smooth landing operation of a robot while preventing an undue landing shock from being produced when the robot lands. Moreover, since the state amount error is reduced to substantially zero each time the robot lands, so that a difference between a floor leaving timing of an actual robot and a floor leaving timing in a desired gait can be minimized when the robot leaves the floor (when the floating period begins). This permits smooth floor leaving operations of the robot to be achieved.

In the first invention, if the desired gait generating means is a means for determining the desired motion by using a dynamic model while inputting at least a reference floor reaction force as a desired value of a floor reaction force to be applied to the robot into the dynamic model that indicates a relationship between a force acting on the robot and a motion of the robot, then it is preferred that a virtual external force is determined on the basis of at least the state amount error, and the virtual external force is additionally input to the dynamic model thereby to determine the desired motion (third invention).

With this arrangement, a desired motion that brings the state amount error close to zero is determined by additionally inputting the virtual external force to the dynamic model. The virtual external force may be determined according to a feedback control law (PD control law or the like) on the basis of, for example, the state amount error. At least a reference floor reaction force and a virtual external force are input to the dynamic model, so that if the virtual external force is not zero, then a desired motion determined by the dynamic model will not match the reference floor reaction force on the dynamic model. More specifically, according to the third invention, the virtual external force is additionally input to the dynamic model thereby to determine a desired motion deliberately deviated from a motion matching the reference floor reaction force on the dynamic model (this means a motion that a robot should take in an ideal environment). Thus, the state amount error is brought close to zero.

In the aforesaid third invention, the desired gait generating means preferably comprises a means for determining a manipulated variable of an external force to be additionally input to the dynamic model in order to bring the state amount error close to zero on the basis of the state amount error according to a feedback control law. Preferably, if a value of the manipulated variable of the external force exists in a predetermined dead zone including zero, then the virtual external force is determined to be zero, or if the value of the manipulated variable of the external force is out of the dead zone, then the virtual external force is determined to be the value equivalent to the deviation of the manipulated variable of the external force from the dead zone (fourth invention).

With this arrangement, if the state amount error exists in the dead zone, that is, if the state amount error is very small, then the virtual external force will be set to zero, so that a desired motion determined by the dynamic model will be closer to a motion matching the reference floor reaction force on the dynamic model, as compared with a case where the dead zone is not present. As a result, it is possible to prevent an actual motion of a robot from excessively deviating from a normal motion with high dynamic stability (satisfying dynamic balancing conditions).

In the first invention, if the desired gait is a gait having a floor reaction force non-acting period during which the floor reaction force acting on the robot is maintained substantially at zero, then the desired gait generating means preferably determines the desired motion so as to bring the state amount error close to zero in the floor reaction force non-acting period (fifth invention).

Similarly, in the third or fourth invention, if the reference floor reaction force has a floor reaction force non-acting period during which the value the floor reaction force is maintained substantially at zero, then the desired gait generating means preferably determines the virtual external force to be substantially zero in periods other than the floor reaction force non-acting period (sixth invention).

More specifically, in the floor reaction force non-acting period, virtually only gravity acts on a robot, so that the motion of the center of gravity of the robot is governed by the gravity, and therefore, only relative motion of each part of the robot need to be considered. In the periods other than the floor reaction force non-acting period, floor reaction forces act on a robot, so that it is highly necessary to satisfy dynamic balancing conditions. Further, the fifth invention makes it possible to match an actual behavior related to a translational motion in the predetermined direction of the robot with a behavior in a desired gait by determining the desired motion so as to bring the state amount error close to zero in the floor reaction force non-acting period, while at the same time, to determine desired motions with emphasis placed on dynamic balancing conditions of the robot in periods other than the floor reaction force non-acting period. As in the case of the fifth invention, the sixth invention also makes it possible to match an actual behavior related to a translational motion in the predetermined direction of the robot with a behavior in a desired gait in the floor reaction force non-acting period by determining the virtual external force to be substantially zero in the periods other than the floor reaction force non-acting period, while at the same time, determining desired motions with emphasis placed on dynamic balancing conditions of the robot in the periods other than the floor reaction force non-acting period.

Moreover, in the fifth invention, the desired gait generating means preferably determines the desired motion such that the desired motion is brought close to a predetermined reference motion at least in the periods other than the floor reaction force non-acting period (seventh invention).

In the sixth invention, the desired gait generating means preferably determines the desired motion so as to bring the desired motion close to a reference motion that balances out the reference floor reaction force on the dynamic model at least in a period during which the virtual external force is determined to be substantially zero (eighth invention).

According to the seventh invention and the eighth invention, desired motions with emphasis placed on dynamic balancing conditions can be determined in periods other than the floor reaction force non-acting period (the seventh invention), or in the period (the eighth invention) wherein the virtual external force is determined to be substantially zero.

In the first invention, the desired gait generating means preferably comprises a means for determining a desired floor reaction force of the robot, and the control device comprises a compliance control means for operating the robot to make a gait of the robot follow the desired motion and the desired floor reaction force (ninth invention).

Similarly, in the third invention, the desired gait generating means preferably comprises a means for determining, at least on the basis of the reference floor reaction force, a desired floor reaction force of a robot that will be imbalanced with the desired motion on the dynamic model, and the control device comprises a compliance control means for operating the robot to make a gait of the robot follow the desired motion and the desired floor reaction force (tenth invention).

According to the ninth invention and the tenth invention, the provision of the compliance control means makes it possible to cause both actual motions of a robot and floor reaction forces to generally follow desired motions and desired floor reaction forces.

Especially in the ninth or tenth invention, the desired gait generating means preferably determines, at least on the basis of the state amount error, the desired floor reaction force such that the state amount error is brought close to zero (eleventh invention).

With this arrangement, a state amount error can be brought close to zero by manipulating both a desired motion and a desired floor reaction force, so that the state amount error can be converged to zero, that is, the state amount error can be promptly eliminated.

According to a twelfth invention of the present invention, a control device of a legged mobile robot comprises desired gait generating means for generating a desired gait formed of a desired motion of a legged mobile robot, which moves by motions of its legs, and a desired floor reaction force, compliance control means for operating the robot such that a gait of the robot follows a desired motion and a desired floor reaction force of the desired gait, and state amount error calculating means for determining, as a state amount error, the difference between a state amount of the desired gait related to a translational motion in a predetermined direction of the robot and an actual state amount of the robot related to the translational motion in the predetermined direction, wherein the desired gait generating means determines a combination of a desired motion and a desired floor reaction force of the robot such that the state amount error is brought close to zero on the basis of at least the state amount error.

According to the twelfth invention, a combination of a desired motion and a desired floor reaction force of a robot is determined so as to bring the state amount error close to zero. In other words, a combination of a desired motion and a desired floor reaction force is manipulated to bring a state amount error close to zero. Hence, as in the case of the first invention, the agreement between a state amount of an actual robot related to the translational motion and a state amount in a desired gait can be improved, and a difference in state amount therebetween (state amount error) can be quickly brought close to zero. As a result, the timing of an actual operation related to the translational motion in the predetermined direction of the robot can be matched with an operation timing in a desired gait. This permits smooth motions of the robot.

In the twelfth invention, preferably, the desired gait generating means comprises a means for determining the desired motion by using a dynamic model while inputting at least a reference floor reaction force as a reference desired value of a floor reaction force to be applied to the robot into the dynamic model indicating a relationship between a floor reaction force acting on the robot and a motion of the robot, and a means for determining on the basis of at least the state amount error a combination of a virtual external force to be additionally input to the dynamic model and a desired floor reaction force correction amount as a correction amount of the desired floor reaction force based on the reference floor reaction force, wherein the virtual external force out of the determined virtual external force and desired floor reaction force correction amount is additionally input to the dynamic model thereby to determine the desired motion, and the reference floor reaction force is corrected using the desired floor reaction force correction amount so as to determine the desired floor reaction force (thirteenth invention).

According to the thirteenth invention, a desired motion is determined such that the state amount error is brought close to zero by additionally inputting the virtual external force to the dynamic model, and the reference floor reaction force is corrected on the basis of the desired floor reaction force correction amount, thereby determining a desired floor reaction force so as to bring the state amount error close to zero.

To be more specific, in the thirteenth invention, a difference between the desired floor reaction force correction amount and the virtual external force is used to manipulate a translational motion in the predetermined direction of a robot. Hence, the desired gait generating means preferably determines a desired value of a difference between the desired floor reaction force correction amount and the virtual external force on the basis of a state amount error so as to bring the state amount error to zero, and then determines a combination of the desired floor reaction force correction amount and the virtual external force such that the determined desired value of the difference is satisfied (fourteenth invention). This makes it possible to properly determine a combination of a desired motion and a desired floor reaction force that allows the state amount error to approach zero.

Furthermore, in the fourteenth invention, the desired gait generating means preferably comprises a means for determining a permissible range of the desired floor reaction force correction amount, and determines a combination of the desired floor reaction force correction amount and a virtual external force to satisfy the desired value of the difference and the permissible range of the desired floor reaction force correction amount (fifteenth invention). More specifically, desired floor reaction forces are desired values of floor reaction forces actually acting on a robot, and floor reaction forces that can be applied to the robot have limitation. Therefore, the permissible range of correction amounts of desired floor reaction forces is determined, as described above, and a combination of the desired floor reaction force correction amount and the virtual external force is determined to satisfy the desired value of the difference and the permissible range of the desired floor reaction force correction amounts, thus making it possible to improve the performance of a robot to follow desired motions and desired floor reaction forces and also to smoothly bring the state amount errors close to zero.

In the aforesaid fifteenth invention, more specifically, the desired gait generating means preferably comprises a means for determining a preliminary value of the desired floor reaction force correction amount on the assumption that the desired virtual external force corresponding to the desired value of the difference is zero, a means for determining a desired floor reaction force correction amount obtained by limiting the preliminary value to a value within the permissible range on the basis of the preliminary value of the desired floor reaction force correction amount and the permissible range, and a means for determining the virtual external force on the basis of the determined desired floor reaction force correction amount and the determined desired value of the difference (sixteenth invention).

With this arrangement, if a desired floor reaction force correction amount determined on the basis of the desired value of the difference, assuming that the virtual external force is zero, lies within the permissible range, then the virtual external force will be determined to be zero. Accordingly, of a desired motion and a desired floor reaction force, the desired floor reaction force is preferentially manipulated to bring the state amount error close to zero. In other words, as long as a floor reaction force can be manipulated, the floor reaction force is manipulated to eliminate a state amount error, and if it is no longer possible to eliminate the state amount error by manipulating a floor reaction force, then a desired motion based on the virtual external force is manipulated and a floor reaction force is also manipulated. This makes it possible to prevent a desired motion from excessively deviating from a motion balancing with the reference floor reaction force on the dynamic model. The permissible range of desired floor reaction force correction amounts in the fifteenth invention defines a dead zone of virtual external forces in the fourth invention.

In the fifteenth or the sixteenth invention, if the desired gait is a gait having a period during which all legs of the robot float in the air, then a permissible range of the desired floor reaction force correction amount is preferably determined to be in a range such that an upper limit value and a lower limit value of the permissible range are substantially zero at least in the floating period (seventeenth invention). With this arrangement, in the floating period in which no floor reaction force is applied to a robot, the state amount error is brought close to zero mainly by manipulating a desired motion by means of the virtual external force. In a floating period during which an actual floor reaction force becomes zero, the reference floor reaction force will be automatically set to zero and the desired floor reaction force correction amount will be substantially zero due to the permissible range. Hence, a difference between an actual floor reaction force and a desired floor reaction force in a floating period will be substantially zero, so that there will be no redundant operation of the compliance control, leading to improved performance of the robot to follow desired motions.

In the aforesaid fourteenth through seventeenth inventions, the desired gait generating means preferably determines a combination of the desired floor reaction force correction amount and a virtual external force that will bring the desired motion close to a reference motion balancing with the reference floor reaction force on the dynamic model while satisfying the desired value of the difference at the same time (eighteenth invention). This makes it possible to compromisingly bring the state amount error close to zero and also to bring a desired motion close to a reference motion balancing with the reference floor reaction force on a dynamic model.

To be more specific, the desired gait generating means preferably comprises a means for determining a first floor reaction force manipulated variable according to a feedback control law for bringing the state amount error close to zero, a means for determining a second floor reaction force manipulated variable according to a feedback control law for bringing the desired motion close to a reference motion balancing with the reference floor reaction force on the dynamic model, a means for determining a permissible range of the desired floor reaction force correction amount, a means for taking a floor reaction force manipulated variable obtained by combining the first floor reaction force manipulated variable and the second floor reaction force manipulated variable as a preliminary value of the desired floor reaction force correction amount and then determining a desired floor reaction force correction amount by limiting the preliminary value to the desired permissible range, and a means for determining the virtual external force such that a difference between the desired floor reaction force manipulated variable and the virtual external force agrees with the first floor reaction force manipulated variable (nineteenth invention).

According to the nineteenth invention, if the state amount error becomes substantially zero, then a floor reaction force manipulated variable obtained by combining the first floor reaction force manipulated variable and the second floor reaction force manipulated variable will be substantially equal to the second floor reaction force manipulated variable for bringing a desired motion close to a reference motion; therefore, a combination of a desired floor reaction force correction amount and a virtual external force is determined on the basis of the second floor reaction force manipulated variable. Hence, the desired floor reaction force correction amount and the virtual external force will be determined such that a desired motion is brought close to the reference motion. If a desired motion substantially agrees with a reference motion, then the floor reaction force manipulated variable obtained by combining the first floor reaction force manipulated variable and the second floor reaction force manipulated variable will be substantially equal to the first floor reaction force manipulated variable for bringing the state amount error close to zero. Hence, a combination of a desired floor reaction force correction amount and a virtual external force will be determined on the basis of the first floor reaction force manipulated variable. Therefore, the desired floor reaction force correction amount and the virtual external force will be determined such that the state amount error approaches zero. Thus, it is possible to compromisingly accomplish both bringing the desired motion close to the reference motion, that is, securing motions of a robot with high dynamic stability, and bringing the state amount error close to zero, that is, making a behavior of a robot related to the translational motion in the predetermined direction agree with a behavior of a desired gait as much as possible. In the nineteenth invention, a desired floor reaction force is preferentially manipulated within a permissible range of the desired floor reaction force correction amount, as in the case of the sixteenth invention.

In the first through the nineteenth invention explained above, the desired gait generating means preferably generates desired gaits for a predetermined period such that the desired gaits for the predetermined period are brought close to virtual periodic gaits (twentieth invention). This makes it possible to generate desired gaits with high stability for a robot.

As explained above, in the first through the twentieth inventions, the state amount is preferably a position of a predetermined part of the robot or a position of the center of gravity of the robot (twenty-first invention). And the predetermined part is preferably a body of the robot (twenty-second invention).

According to a twenty-third invention of a control device of a legged mobile robot in accordance with the present invention, a control device of a legged mobile robot adapted to generate a desired gait of a legged mobile robot that moves by motions of its legs and to control an operation of the robot so as to follow the desired gait comprises desired gait generating means for generating the desired gait, self position estimating means for taking at least one of the position of a predetermined part of the robot and the position of the center of gravity of the robot as a representative self position of the robot so as to estimate the representative self position, positional error calculating means for determining, as a predetermined direction positional error, a component of a predetermined direction in a difference between the estimated representative self position and a representative self position in the desired gait, and floor shape recognizing means for measuring a vertical position of an expected landing point on a floor where a distal portion of a leg, which performs a landing operation of the robot, is expected to actually land according to a desired landing point in the desired gait, wherein the desired gait generating means corrects the desired gait on the basis of at least the predetermined direction positional error determined by the positional error calculating means and the vertical position of the expected landing point measured by the floor shape recognizing means.

In the twenty-third invention, a predetermined direction positional error corresponds to a state amount error in the first through the twenty-second invention. According to the twenty-third invention, the desired gait is corrected on the basis of the predetermined direction positional error and a vertical position of the expected landing point measured by the floor shape recognizing means. This makes it possible to generate a desired gait matching an actual floor height while eliminating the predetermined direction positional error at the same time even if the vertical position (height) of the floor at an expected landing point is shifted from a vertical position predicted in an original desired gait. As a result, an actual floor leaving timing or landing timing of a robot can be matched with a timing on a desired gait, permitting smooth movement of a robot to be accomplished.

Preferably, the predetermined part is a body of a robot.

In the twenty-third invention, the desired gait generating means preferably comprises a means for correcting a desired motion defining a trajectory of the representative self position in the desired gait on the basis of at least the predetermined direction positional error such that the predetermined direction positional error approaches zero, and a means for correcting a desired motion defining a trajectory of a distal portion of a leg in the desired gait on the basis of at least a vertical position of the expected landing point that has been measured (twenty-fourth invention). With this arrangement, the predetermined direction positional error approaches zero by a desired motion defining a trajectory of the representative self position, e.g., correction (manipulation) of a desired motion of a body, and a desired motion defining a trajectory of a distal portion of a leg is corrected (manipulated) with respect to a shift in the vertical position (height) of a floor at an expected landing point, thus ensuring smooth landing of the leg.

The desired motion defining the trajectory of the representative self position in the twenty-fourth invention may be corrected (manipulated) as in the first to the nineteenth invention described above, regarding the predetermined direction positional error as the state amount error.

In the twenty-third invention, based on at least a difference between the vertical position of the expected landing point that has been measured and the vertical position of the desired landing point in the desired gait, and the predetermined direction positional error, the desired gait generating means may correct a desired motion defining a trajectory of the representative self position in the desired gait so that the above difference and error approach to zero (twenty-fifth invention). With this arrangement, the desired motion defining a trajectory of the representative self position (e.g., a desired motion of a body) will be corrected (manipulated) so that the difference between the vertical position of the expected landing point and the vertical position of the desired landing point in the desired gait, and the predetermined direction positional error both approach zero. In this case, a desired motion defining a trajectory of the representative self position may be corrected (manipulated) as in the first to the nineteenth invention described above, regarding a sum of the difference between the vertical position of the expected landing point and the vertical position of a desired landing point in the desired gait and the predetermined direction positional error, as the state amount error.

According to a twenty-sixth invention of a control device of a legged mobile robot in accordance with the present invention, a control device of a legged mobile robot comprises compliance control means for controlling an operation of a robot so that the robot follows a desired gait composed of a desired motion of a legged mobile robot that moves by motions of its legs and a desired floor reaction force, the compliance control means grasping a floor reaction force actually acting on the robot and correcting, from a relative position defined by the desired motion, a relative position of a distal portion of a leg in relation to a body of the robot on the basis of a floor reaction force error, which is a difference between the grasped floor reaction force and the desired floor reaction force, wherein the desired gait is a gait having a floating period in which all legs of the robot float in the air, and the compliance control means reduces a gain of a correction amount of the relative position of the distal portion of the leg relative to the floor reaction force error at least immediately before the floating period.

According to the twenty-sixth invention, the gain (gain of the compliance control means) of the correction amount of the relative position of the distal portion of the leg relative to the floor reaction force error is reduced at least immediately before the floating period. Hence, the compliance control will be secured immediately before a floating period begins. As a result, the capability of distal portions of legs to follow desired motions of desired gaits is improved, allowing the legs to smoothly leave a floor without being tripped.

A twenty-seventh invention of a control device of a legged mobile robot in accordance with the present invention is characterized in that a control device of a legged mobile robot adapted to generate a desired gait that includes at least a desired motion of a legged mobile robot that moves by motions of its legs, and to control an operation of the robot so that the robot follows the desired gait, the control device comprising desired gait generating means for generating the desired gait including at least a floating period in which all legs of the robot float in the air, self position estimating means for taking at least one of the position of a predetermined part of the robot and the position of the center of gravity of the robot as a representative self position of the robot so as to estimate the representative self position, positional error calculating means for determining, as a predetermined direction positional error, a component of a predetermined direction in a difference between the estimated representative self position and a representative self position in the desired gait, and a leg distal portion position correcting means for correcting the position of a distal portion of a leg of the robot on the basis of a position defined by the desired gait so as to bring the predetermined direction positional error close to zero at least on the basis of the predetermined direction positional error, wherein the leg distal portion position correcting means forcibly sets a correction amount of the position of the distal end portion of the leg to substantially zero regardless of the predetermined direction positional error at least by the time the floating period of the desired gait begins. The predetermined portion is preferably, for example, a body of a robot.

According to the twenty-seventh invention, the position of a distal portion of a leg is corrected (manipulated) basically to bring the predetermined direction positional error close to zero before a start of the floating period, i.e., in a supporting leg period in which one of legs is in contact with a ground, and the correction amount is forcibly set to zero by the time the floating period begins. For this reason, when the floating period starts, a trajectory of a leg distal portion is controlled to be a position/posture of the leg distal portion defined by an original desired gait, i.e., a position/posture suited for performing a floor leaving operation. As a result, a leg can be smoothly left from a floor without being tripped.

According to a twenty-eighth invention of a control device of a legged mobile robot in accordance with the present invention, a control device of a legged mobile robot for generating a desired gait composed of a desired motion and a desired floor reaction force of a legged mobile robot that moves by motions of its legs, and controlling an operation of the robot so as to make the robot follow the desired gait, the control device comprising a desired gait generating means for generating the desired gait including at least a floating period in which all legs of the robot float in the air, self position estimating means for taking at least one of the position of a predetermined part of the robot and the position of the center of gravity of the robot as a representative self position of the robot so as to estimate the representative self position, positional error calculating means for determining, as a predetermined direction positional error, a component of a predetermined direction in a difference between the estimated representative self position and a representative self position in the desired gait, and floor reaction force correcting means for correcting a desired floor reaction force in the desired gait so as to bring the predetermined direction positional error close to zero on the basis of at least the predetermined direction positional error, wherein the floor reaction force correcting means forcibly sets a correction amount of the desired floor reaction force to substantially zero regardless of the predetermined direction positional error at least by the time the floating period of the desired gait begins.

According to the twenty-eighth invention, a desired floor reaction force of a desired gait is corrected (manipulated) basically to bring the predetermined direction positional error close to zero before a start of a floating period, i.e., in a supporting leg period in which one of the legs is in contact with a ground, and the correction amount is forcibly set to zero by the time the floating period begins. For this reason, when the floating period starts, a desired floor reaction force is determined to be an original desired floor reaction force, i.e., a desired floor reaction force suited for performing a floor leaving operation of a robot, and motions or the like of the legs are controlled such that an actual floor reaction force follows the desired floor reaction force. As a result, a leg can be smoothly left from a floor without being tripped.

BRIEF DESCRIPTION OF THE DRAWINGS

FIGS. 14 (a) through (d) are graphs showing exemplary settings of a floor reaction force vertical component of a desired gait, a desired ZMP, and gains (FIGS. 14 (c) and (d)) in the processing of the control unit for stabilizing the vertical position of the body.

FIG. 16 is a flowchart showing subroutine processing of an essential section of FIG. 15.

FIG. 20 is a block diagram showing processing of an essential section in a fourth embodiment.

BEST MODE FOR CARRYING OUT THE INVENTION

Referring now to the accompanying drawings, a control device of a legged mobile robot according to embodiments of the present invention will be explained. As the legged mobile robot, a bipedal mobile robot will be taken as an example.

Figure 1:
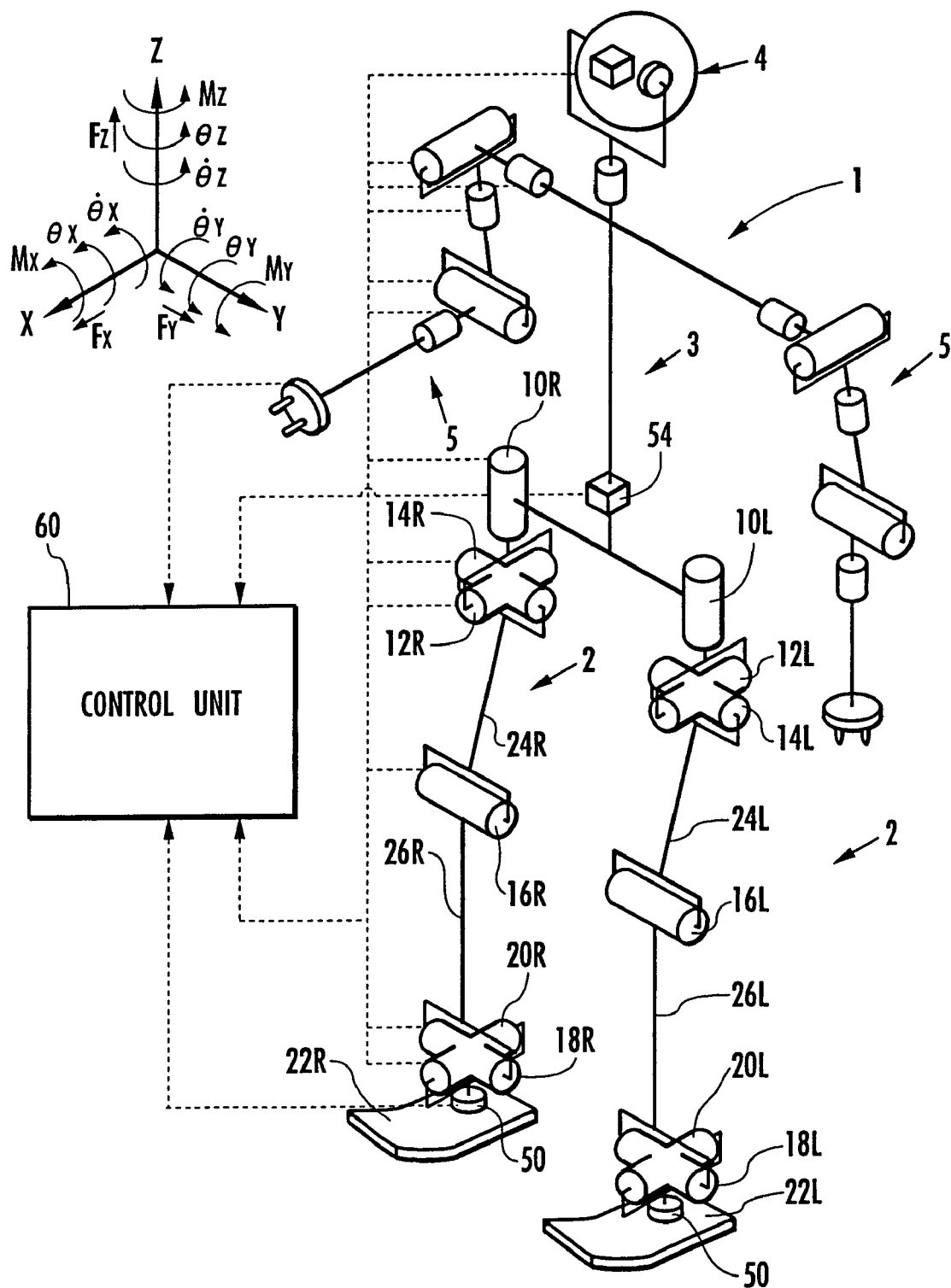
FIG. 1 is a schematic diagram showing an outline of a general construction of a bipedal mobile robot as a legged mobile robot in an embodiment of the present invention.

FIG. 1 is a schematic diagram generally showing a bipedal mobile robot as a legged mobile robot according to the present embodiment.

As shown in the figure, a bipedal mobile robot (hereinafter referred to as "the robot") 1 is equipped with a pair of right and left legs (leg links) 2, 2 provided such that they extend downward from a body (a base body of the robot 1) 3. The two legs 2, 2 share the same construction, each having six joints. The six joints of each leg are comprised of, in the following order from the body 3 side, joints 10R, 10L (symbols R and L mean correspondence to the right leg and the left leg, respectively; the same will be applied hereinafter) for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg 2 is attached to the bottoms of the two joints 18R(L) and 20R(L) of the ankle of each leg 2. The body 3 is installed at the uppermost top of the two legs 2, 2 through the intermediary of the three joints 10R(L), 12R(L) and 14R(L) of the hip of each leg 2. A control unit 60 or the like, which will be discussed in detail hereinafter, is housed inside the body 3. For convenience of illustration, the control unit 60 is shown outside the body 3 in FIG. 1.

In each leg 2 having the aforesaid construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arms 5, 5 is attached to both sides of an upper portion of the body 3, and a head 4 is disposed at a top end of the body 3. Of these arms 5, 5 and the head 4, the arms 5 are not directly connected to a topic of the present invention, so that detailed explanation thereof will be omitted. The head 4 will be discussed hereinafter.

According to the construction described above, the foot 22R(L) of each leg 2 is given six degrees of freedom relative to the body 3. During a travel, such as walking, of the robot 1, desired motions of the two feet 22R and 22L can be accomplished by driving 6*2=12 joints of the two legs 2, 2 together ("*" in the present description will denote multiplication as scalar computation, while it will denote an outer product in vector computation) at appropriate angles. This arrangement enables the robot 1 to arbitrarily move in a three-dimensional space.

As shown in FIG. 1, a publicly known six-axis force sensor 50 is provided between the ankle joints 18R(L), 20R(L) and the foot 22R(L) of each leg 2. The six-axis force sensor 50 detects primarily whether the foot 22R(L) of each leg 2 is in contact with a ground, and a floor reaction force (landing load) acting on each leg 2, and it outputs detection signals of three-direction components Fx, Fy, and Fz of a translational force of the floor reaction and three-direction components Mx, My, and Mz of a moment to the control unit 60. Furthermore, the body 3 is equipped with an inclination sensor 54 for mainly detecting an inclination (posture angle) of the body 3 relative to a Z-axis (vertical direction (gravitational direction)) and an angular velocity thereof, and detection signals thereof are supplied from the inclination sensor 54 to the control unit 60. The inclination sensor 54 is provided with a three-axis direction accelerometer and a three-axis direction gyro sensor, which are not shown, and detection signals of these sensors are used to detect an inclination and an angular velocity of the body 3 and also used to estimate a self position/posture of the robot 1. Although detailed structures are not shown, each joint of the robot 1 is provided with an electric motor 64 (refer to FIG. 5) for driving the joint, and an encoder (rotary encoder) 65 (refer to FIG. 5) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 5) is provided at an appropriate position of the robot 1. The joystick 73 is constructed in such a manner that a request regarding a gait of the robot 1, such as a request for turning the robot 1 that is moving straight, is input to the control unit 60 as necessary by operating the joystick 73.

Figure 2:
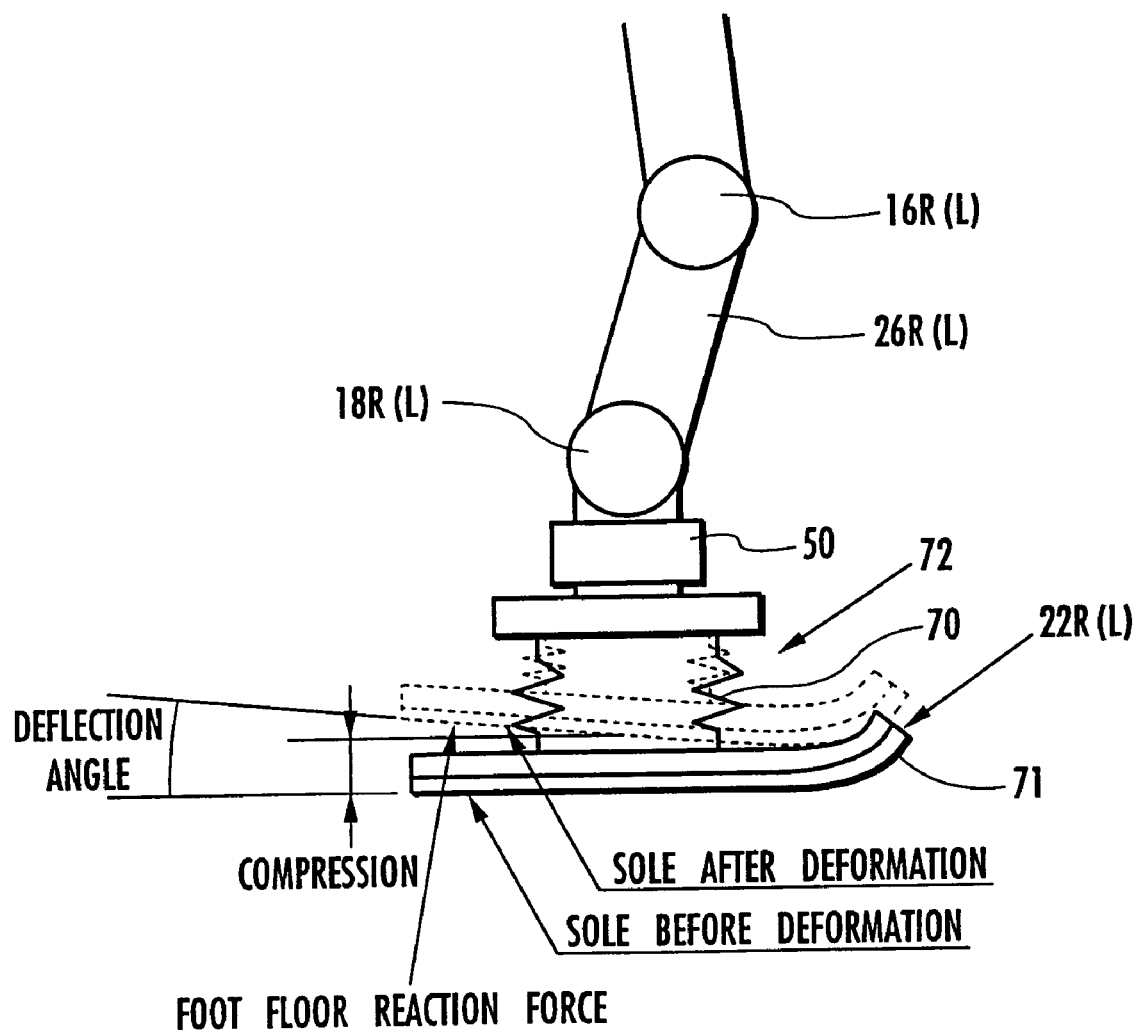
FIG. 2 is a schematic diagram schematically showing a construction of a foot portion of each leg shown in FIG. 1.

FIG. 2 is a diagram schematically showing a basic construction of a distal portion (including each foot 22R(L)) of each leg 2 in the present embodiment. As shown in the diagram, a spring mechanism 70 is installed between each foot 22R(L) and the six-axis force sensor 50, and a foot sole elastic member 71 made of rubber or the like is bonded to a foot sole (the bottom surface of each of the feet 22R and L). These spring mechanism 70 and the foot sole elastic member 71 constitute a compliance mechanism 72. The spring mechanism 70, which will be discussed in detail later, is constructed of a square guide member (omitted in FIG. 2), which is installed on the upper surface of the foot 22R(L), and a piston-shaped member (omitted in FIG. 2) installed adjacently to the ankle joint 18R(L) (the ankle joint 20R(L) being omitted in FIG. 2) and the six-axis force sensor 50, and housed in the guide member through the intermediary of an elastic member (rubber or spring) so that it may be jogged.

The foot 22R(L) indicated by a solid line shown in FIG. 2 is in a state where it is subjected to no floor reaction force.

When each leg 2 is subjected to a floor reaction force, the spring mechanism 70 and the foot sole elastic member 71 of the compliance mechanism 72 flex, causing the foot 22R(L) to shift to the position/posture illustrated by a dashed line in the drawing. The structure of the compliance mechanism 72 is important not only to ease a landing impact but also to enhance controllability, as explained in detail in, for example, Japanese Unexamined Patent Publication Application 5-305584 proposed in the past by the present applicant.

Figure 3:
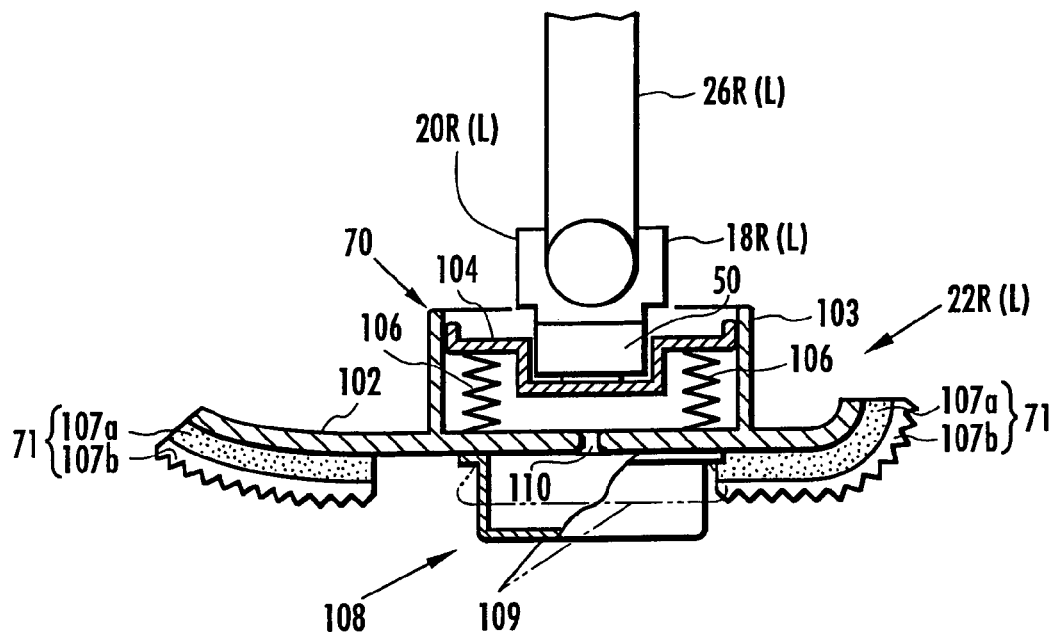
FIG. 3 and FIG. 4 are a sectional view observed sideways and a bottom view, respectively, showing detailed construction of the foot portion of each leg.
Figure 4:
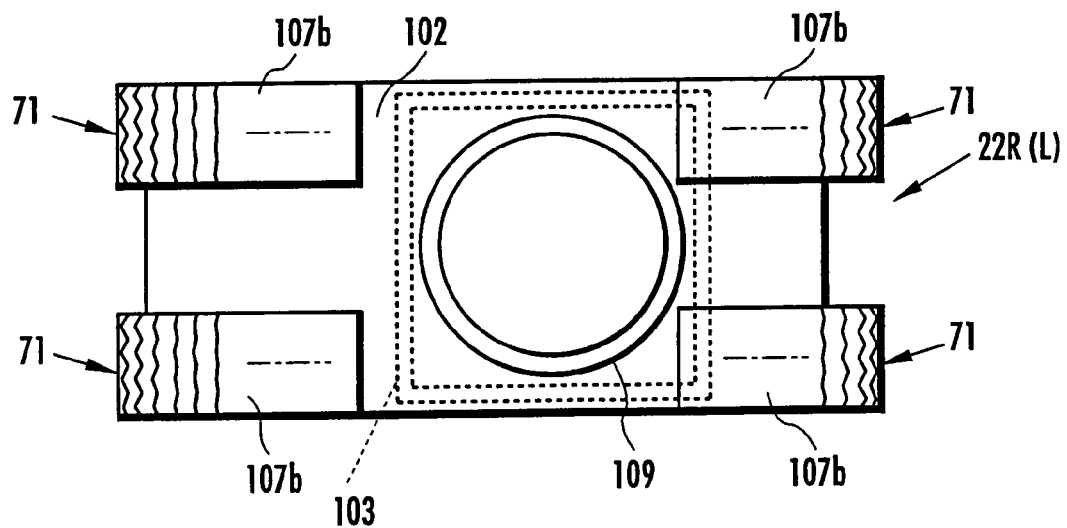

More detailed construction of the foot 22R(L) including the compliance mechanism 72 (hereinafter referred to as the foot mechanism 22R(L) in some cases) will be further explained with reference to FIG. 3 and FIG. 4. FIG. 3 is a sectional view of the foot mechanism 22R(L) observed sideways, and FIG. 4 is a top plan view of the foot mechanism 22R(L) observed from its bottom surface.

The foot mechanism 22R(L) is equipped with a roughly plate-shaped foot plate member 102 as a skeletal member. A front end portion (tiptoe portion) and a rear end portion (heel portion) of the foot plate member 102 are slightly curved upward, the remaining portion being shaped like a flat plate. A guide member 103 having a square cross-sectional shape is fixedly provided on an upper surface of the foot plate member 102 such that an axial center thereof is vertically oriented. Inside the guide member 103, a movable plate (piston-shaped member) 104 is provided along an inner peripheral surface of the guide member 103 such that it is virtually movable in a vertical direction, the movable plate 104 being connected to the ankle joints 18R(L) and 20R(L) through the intermediary of the six-axis force sensor 50.

A rim of the bottom surface of the movable plate 104 is connected to the upper surface of the foot plate member 102 through the intermediary of a plurality of elastic members 106 made of an elastic material, such as a spring or rubber (shown as a spring in the drawing). Hence, the foot plate member 102 is connected to the ankle joint 18R(L) through the intermediary of the elastic member 106, the movable plate 104, and the six-axis force sensor 50. The interior of the guide member 103 (the space under the movable plate 104) is opened to the air through the intermediary of a hole or gap, which is not shown. Atmospheric air freely goes into and out of the guide member 103. The guide member 103, the movable plate 104, and the elastic member 106 constitute the spring mechanism 70 shown in FIG. 2.

A ground contact member 71 serving as the foot sole elastic member 71 shown in FIG. 2 mentioned above is attached to a bottom surface (lower surface) of the foot plate member 102. The ground contact member 71 is an elastic member (elastic member directly coming in contact with a floor surface) provided between the foot plate member 102 and the floor surface with the foot mechanism 22R(L) grounded. In the present embodiment, the ground contact member 71 is secured to four corners of the ground contact surface of the foot plate member 102 (both side portions of the tiptoe of the foot plate member 102 and both side portions of the heel).

The ground contact member 71 is formed of two layers, namely, a soft layer 107a made of a relatively soft rubber material and a hard layer 107b made of a relatively hard rubber material, which are vertically stacked. The hard layer 107b is provided on the lowermost surface side as the ground contact surface coming directly in contact with a floor surface when the leg 2 lands.

The foot mechanism 22R(L) is provided with a landing shock absorber 108 in addition to the above components. The landing shock absorber 108 has a bag-shaped member 109 attached to the bottom surface of the foot plate member 102, and a passage 110 for entry and exit of air (atmospheric air) serving as a compressive fluid in relation to the interior of the bag-shaped member 109.

The bag-shaped member 109 surrounded by the ground contact member 71 is provided nearly in a central area of the bottom surface of the foot plate member 102. The bag-shaped member 109 is made of an elastic material, such as rubber, so as to be deformable. The bag-shaped member 109 is shaped like a cylindrical container that is open upward, as indicated by a solid line in FIG. 3, in its natural state wherein it has developed no resilient deformation caused by an external force. The entire peripheral edge of the opening of the bag-shaped member 109 is secured to the bottom surface of the foot plate member 102, and covered by the foot plate member 102. The bag-shaped member 109 is provided such that the bottom portion of the bag-shaped member 109 juts out downward beyond the ground contact member 71 in its natural state wherein it is shaped like the cylindrical container. In other words, the bag-shaped member 109 has a height (a distance from the bottom surface of the foot plate member 102 to the bottom portion of the bag-shaped member 109) that is larger than the thickness of the ground contact member 71. Hence, in a state wherein the foot plate member 102 is grounded through the intermediary of the ground contact member 71 (the leg 2 being landed), the bag-shaped member 109 is compressed in the direction of the height of the bag-shaped member 109 due to a floor reaction force, as indicated by a virtual line in FIG. 3.

In the present embodiment, the natural state wherein the bag-shaped member 109 is shaped like the cylindrical container is a state in which the bag-shaped member 109 is inflated. Since the bag-shaped member 109 is formed of an elastic material, it has a force for restoring its original shape (the cylindrical container shape) in its natural state.

The passage 110 provides an inflow/outflow means for air to go into/out of the bag-shaped member 109. In the present embodiment, the passage 110 is formed of a channel hole drilled in the foot plate member 102 to provide communication between the interior of the bag-shaped member 109 and the interior of the guide member 103. In this case, as previously described, the interior of the guide member 103 is opened to the atmosphere, meaning that the passage 110 provides communication between the interior of the bag-shaped member 109 and the atmosphere. Thus, air in the atmosphere is free to go into/out of the bag-shaped member 109 through the intermediary of the passage 110. The bag-shaped member 109 is filled with air when the bag-shaped member 109 is in its inflated state (natural state), the pressure therein being equivalent to atmospheric pressure. The passage 110 is a throttle passage so that a fluid resistance is generated when air moves into or out of the bag-shaped member 109.

Figure 5:
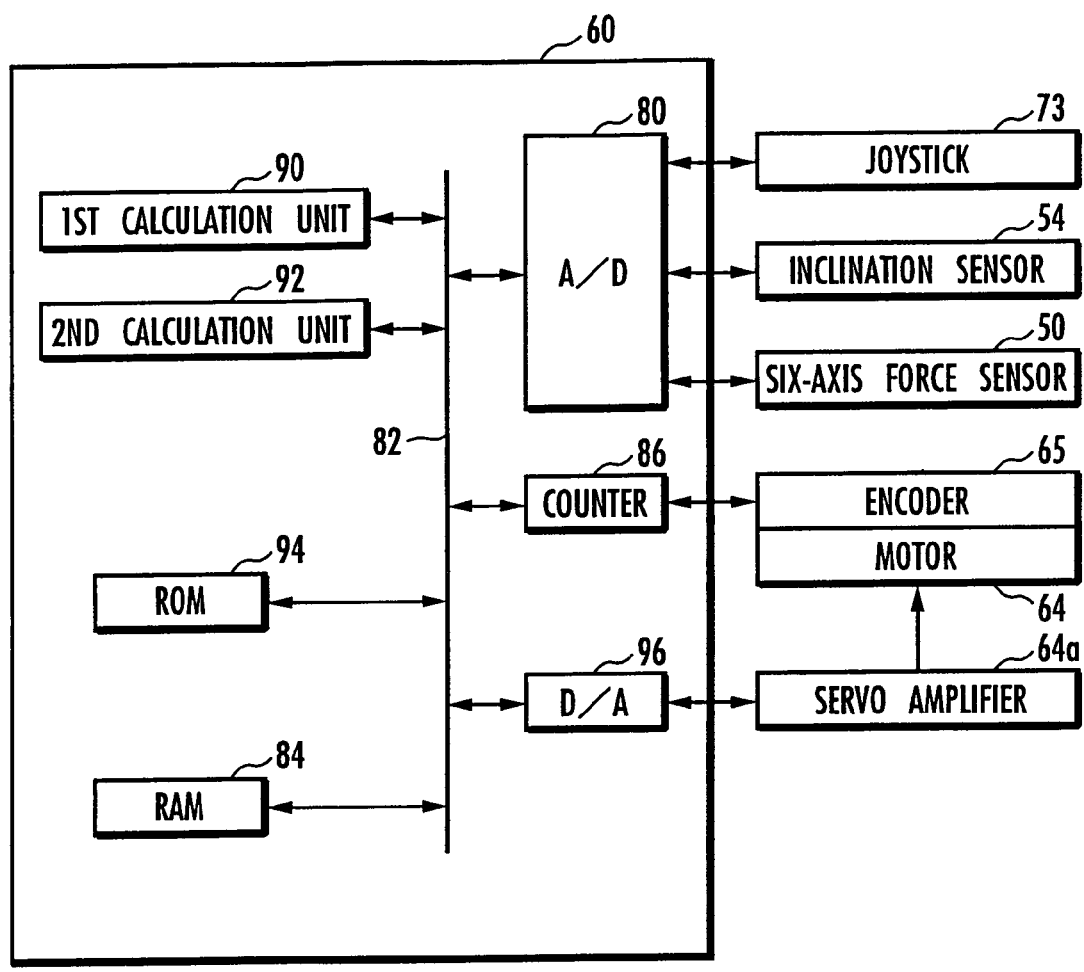
FIG. 5 is a block diagram showing a construction of a control unit provided on the robot shown in FIG. 1.

FIG. 5 is a block diagram showing a construction of the control unit 60. The control unit 60 is comprised of a microcomputer, and includes a first calculation unit 90 and a second calculation unit 92 constructed of CPUS, an A/D converter 80, a counter 86, a D/A converter 96, a RAM 84, a ROM 94, and a bus line 82 for transferring data among them. In the control unit 60, output signals of the six-axis force sensor 50, the inclination sensor 54 (an accelerometer and a rate gyro sensor), the joystick 73, etc. of each leg 2 are converted into digital values by the A/D converter 80 and sent to the RAM 84 via the bus line 82. Outputs of the encoder 65 (rotary encoder) of each joint of the robot 1 are supplied to the RAM 84 via the counter 86.

As will be discussed hereinafter, the first calculation unit 90 generates desired gaits, calculates a joint angle displacement command (a displacement angle of each joint or a command value of a rotational angle of each electric motor 64), and sends the calculation result to the RAM 84. The second calculation unit 92 reads an actual measurement value of a joint angle detected on the basis of the joint angle displacement command and an output signal of the encoder 65 from the RAM 84 to calculate a manipulated variable required for driving each joint, and outputs the calculated variable to the electric motor 64 for driving each joint through the intermediary of the D/A converter 96 and a servo amplifier 64a.

Figure 6:
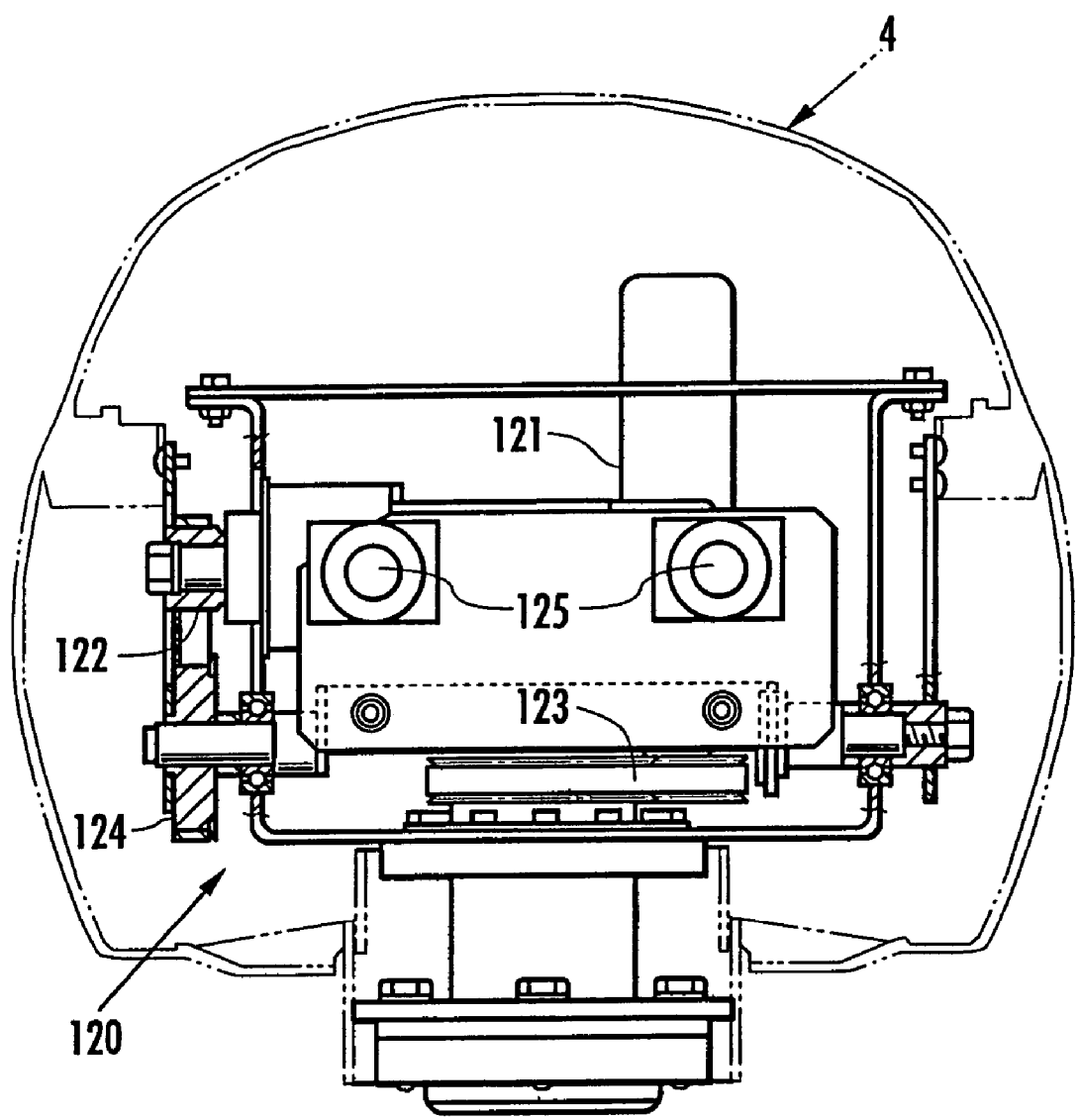
FIG. 6 and FIG. 7 are a front view and a side view, respectively, of an internal construction of a head of the robot.
Figure 7:
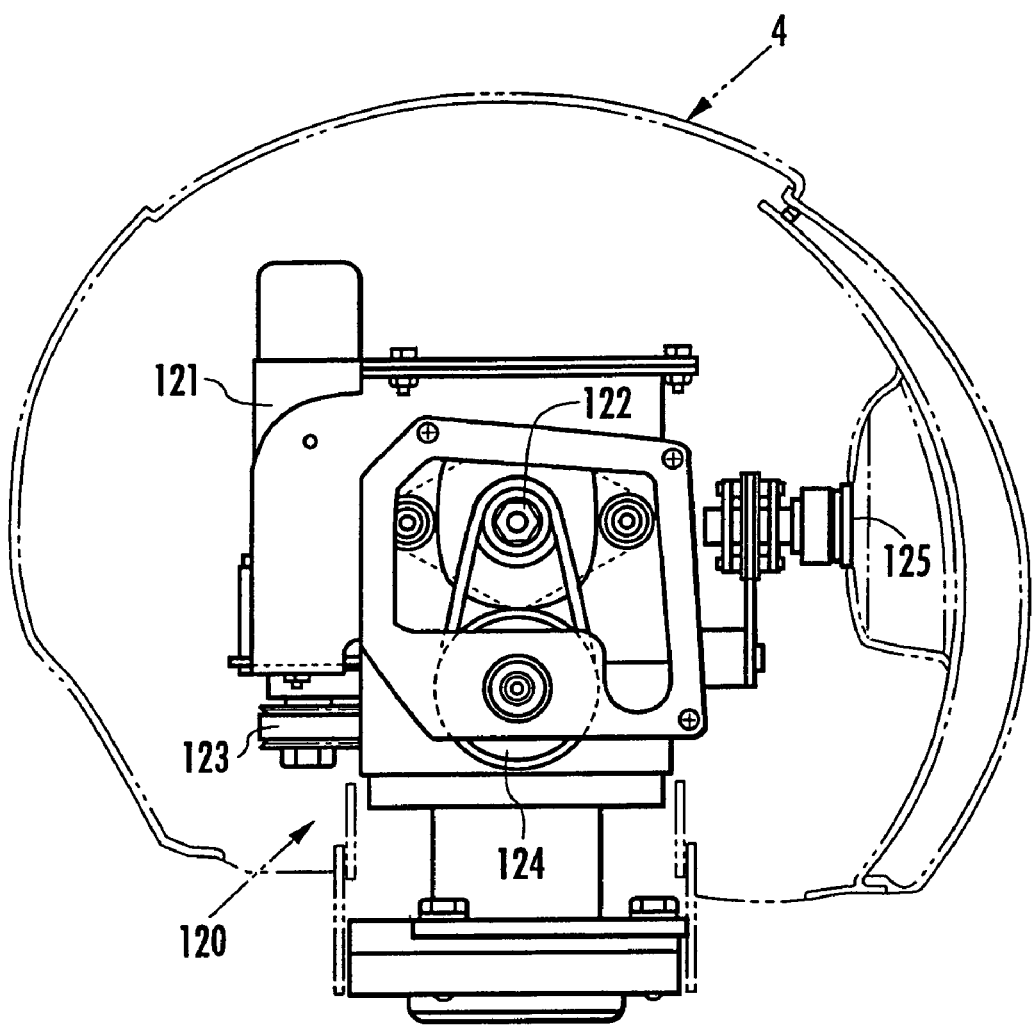

FIG. 6 and FIG. 7 are figures showing an internal construction of the head 4 of the robot 1. FIG. 6 is a front view, while FIG. 7 is a side view. The head 4 is connected to the upper portion of the body 3 through the intermediary of a neck joint 120 that rotates in panning and tilting directions.

Like other joints, the neck joint 120 has motors 121 and 122 with encoders (joint displacement detectors) and decelerators 123 and 124, and is controlled to follow joint displacement commands from the control unit 60 through the intermediary of a motor control unit, which is not shown.

The head 4 is equipped with two, right and left, video cameras 125, 125 as environment recognizing means so as to be able to stereoscopically view objects. Although not shown in FIG. 3, outputs (imaging information) of the video cameras 125, 125 are supplied to the control unit 60, and the control unit 60 recognizes a distance or the like to an object in imaging information.

The two, right and left, video cameras 125 and 125 may be replaced by the following environment recognizing means:
a) Means for enabling stereoscopic views with three or more cameras,
b) Means for recognizing multiple points of an object by a single camera to estimate a distance according to the principle of triangulation, or
c) Non-contact multipoint distance measuring device, such as a range finder or a scanning laser distance meter.

Figure 8:
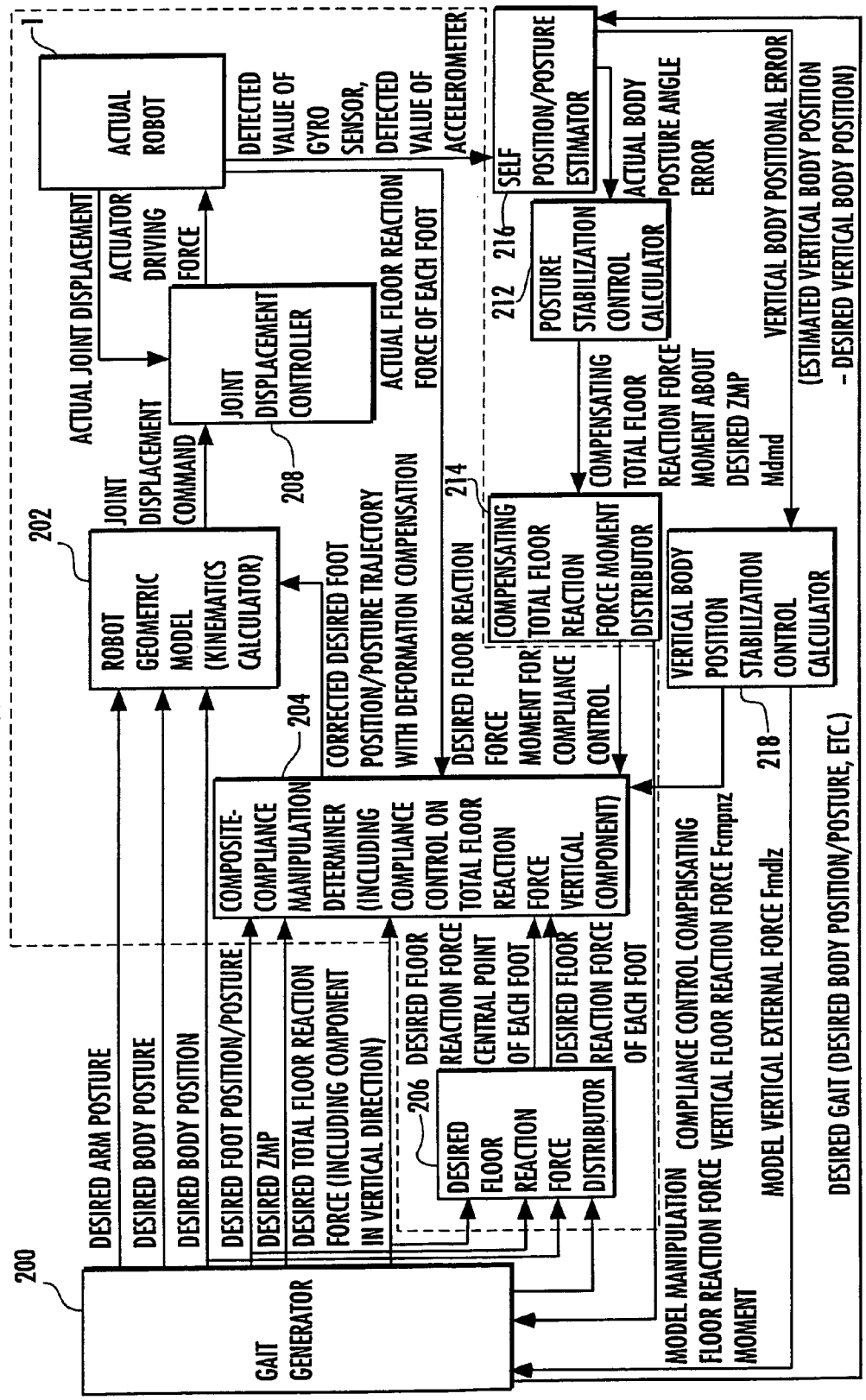
FIG. 8 is a block diagram showing a functional construction of the control unit shown in FIG. 5.

FIG. 8 is a block diagram showing the entire functional construction of a control unit of the leg type moving robot in accordance with the present embodiment. A portion except for the "actual robot" in FIG. 8 is constituted by processing functions implemented by the control unit 60 (primarily the functions of the first calculation unit 90 and the second calculation unit 92). In the following explanation, the symbols R and L will be omitted unless it is necessary to discriminate right and left of the legs 2.

The control unit 60 is equipped with a gait generator 200 for generating and outputting desired gaits of the robot 1 freely in real time. A desired gait output by the gait generator 200 is constituted of a desired body position/posture trajectory (trajectory of a desired position and a desired posture of the body 3), a desired foot position/posture trajectory (trajectory of a desired position and a desired posture of each foot 22), a desired arm posture trajectory (trajectory of a desired posture of each arm 5), a desired total floor reaction force central point (desired ZMP) trajectory, and a desired total floor reaction force trajectory. A desired position/posture trajectory of a movable part relative to the body 3, such as the head 4, in addition to the legs 2 and the arms 5 may be added to the desired gait, as necessary.

Complementary explanation will be added to meanings or definitions of terms used in the embodiment of the present invention. The term "trajectory" in the above gait means a temporal change pattern (time series pattern), and may be referred to as "pattern" in place of "trajectory" in the following explanation. Furthermore, a "posture" of each part means a spatial orientation. For example, a posture of a body is represented by an inclination angle (posture angle) of the body 3 in the roll direction (about the X-axis) relative to the Z-axis (vertical axis), an inclination angle (posture angle) of the body 3 in the pitch direction (about the Y-axis) relative to the Z-axis, and a rotational angle of the body 3 in the yaw direction (about the Z-axis). A foot posture is represented by means of a spatial azimuth of two axes fixedly set on each foot 22. A desired arm posture is represented by relative postures of all parts of the arms 5, 5 with respect to the body 3.

A body position means a predetermined position of the body 3, specifically, the position of a preset representative point of the body 3. Similarly, a foot position means the position of a preset representative point of each of the feet 22R and 22L. A body speed means a moving speed of the aforementioned representative point of the body 3, and a foot speed means a moving speed of the aforementioned representative point of each of the feet 22R and 22L.

The term "desired" in a desired gait, such as in a desired body position/posture, will be frequently omitted in the following explanation when there is no danger of misunderstanding. Of gaits, constituent elements other than those related to a floor reaction force, that is, the gaits related to motions of the robot 1, such as a foot position/posture and a body position/posture, will be collectively referred to as "motion."

A floor reaction force (floor reaction force comprised of a translational force and moment) of each of the feet 22R, L is referred to as "each-foot floor reaction force", and a resultant force of the floor reaction forces of all (two) feet 22R and 22L of the robot 1 will be referred to as "total floor reaction force". In the following explanation, however, each foot floor reaction force will hardly be referred to, so that "floor reaction force" will be handled as having the same meaning as "total floor reaction force" unless otherwise specified.

A desired floor reaction force is generally expressed by a point of action and a force (translational force) applied to the point of action and moment of the force. The point of action may be set at any location, so that innumerable expressions are possible for the same desired floor reaction force. If, however, a desired floor reaction force is expressed using especially the aforesaid desired floor reaction force central point as the point of action, then the moment of the force will be zero except for a component of a vertical axis.

In the case of a gait that satisfies dynamic balancing conditions, a ZMP calculated from a desired motion trajectory (a point at which moment of a resultant force of an inertial force and gravity of the robot 1 calculated from the desired motion trajectory acts about the point becomes zero except for a vertical-axis component) agrees with a central point of a desired total floor reaction force. Therefore, providing a desired ZMP trajectory can be regarded as equivalent to providing a desired total floor reaction force central point trajectory (refer to, for example, PCT publication of unexamined application WO/02/40224 by the present applicant for details).

From the background described above, in the description of PCT publication of unexamined application WO/02/40224, a desired gait has been defined as follows:
a) In a broad sense, a desired gait is a combination of a desired motion trajectory of a period of one step or a plurality of steps and a desired floor reaction force trajectory.
b) In a narrow sense, a desired gait is a combination of a desired motion trajectory of a period of one step and its ZMP trajectory.
c) A series of gaits is formed of several gaits that are connected.

To walk the robot 1, a vertical position of the body (a height of the body) is determined by a body height determining technique proposed previously in Japanese Unexamined Patent Application Publication No. 10-86080 by the present applicant. This subordinately determines a translational force component of a floor reaction force, so that ZMP alone has been adequate as a physical amount to be explicitly set for the floor reaction force of a desired gait. Accordingly, in the description of PCT publication of unexamined application WO/02/40224, the above b) has been adequate as the desired gait in the narrow sense. To run the robot 1, a floor reaction force vertical component is also important for control, so that it is preferable to explicitly set the floor reaction force vertical component. For this reason, the following b') has been adopted for a desired gait in a narrow sense in PCT application (PCT/JP02/13596) previously proposed by the present applicant.

b') A desired gait in a narrow sense is a combination of a desired motion trajectory of a period of one step and its ZMP trajectory, and a trajectory of a floor reaction force vertical component.

In the present description, the term "desired gaits" used hereinafter will mean the desired gaits in a narrow sense unless otherwise specified. Furthermore, the term "one step" of a desired gait will mean a period from the moment one leg 2 of the robot 1 touches the ground to the moment the other leg 2 touches the ground.

Needless to say, a two-leg supporting period in a gait will refer to a period during which the robot 1 supports its own weight by the two legs 2, 2, a one-leg supporting period will refer to a period during which the robot 1 supports its own weight only by one leg 2, and a floating period will refer to a period during which the two legs 2, 2 are apart from a floor (in the air).

In the one-leg supporting period, the leg 2 not supporting the self-weight of the robot 1 will be referred to as a "free leg," and the leg 2 supporting the self-weight will be referred to as a "supporting leg." While the robot 1 is walking, the two-leg supporting period and the one-leg supporting period are alternately repeated. While the robot 1 is running, the one-leg supporting period and the floating period are alternately repeated. In this case, during the floating period of running, both legs 2, 2 do not support the self-weight of the robot 1; however, the leg 2 that was a free leg and the leg 2 that was a supporting leg during a one-leg supporting period immediately before the floating period will be referred to as a "free leg" and a "supporting leg," respectively, even in the floating period.

Positions/postures of individual parts of the robot 1 in a desired gait, including a desired body posture, a desired body position, a desired foot position/posture, and a desired arm posture, will be described by means of a supporting leg coordinate system. The supporting leg coordinate system is a coordinate system fixed to a floor surface having its origin near a ground contact surface of the foot 22 of a supporting leg. More detailedly, as described in U.S. Pat. No. 3,273,443 by the present applicant, in the supporting leg coordinate system, the origin is a point of the center of an ankle joint of the supporting leg vertically projected toward the ground contact surface when the foot 22 of the supporting leg is rotated to a horizontal posture without allowing the foot 22 to slip against the ground contact surface. A horizontal axis (an axis in the longitudinal direction of the foot 22) extending toward a tiptoe of the supporting leg foot 22 provides the X-axis, a vertical axis provides the Z-axis, and a coordinate axis (axis in the lateral direction of the foot 22) orthogonal to these X-axis and Z-axis provides the Y-axis.

The gait generator 200 according to the embodiment of the present invention uses landing positions/postures of the foot 22 of a free leg and required values (desired values) of landing time up to two steps ahead as inputs to generate a desired gait composed of a desired body position/posture trajectory, a desired foot position/posture trajectory, a desired ZMP trajectory, a desired floor reaction force vertical component trajectory, and a desired arm posture trajectory. At this time, some of parameters defining these trajectories (referred to as gait parameters) are corrected to satisfy continuity of a gait.

The gait generator 200 defines a desired gait (desired gait in the narrow sense) for one step from the moment one leg 2 of the robot 1 touches the ground to the moment the other leg 2 touches the ground as a unit, and generates the desired gait for the one step in order. Here, a gait that is currently generating or will be generated will be referred to as a "current time gait," the next time gait will be referred to as a "next time gait," and a gait after next will be referred to as a "next but one time gait." Furthermore, a desired gait generated one step before the current time gait will be referred to as a "last time gait."

Some of desired gaits generated by the gait generator 200 will be illustratively outlined. For example, a desired foot position/posture trajectory is generated using a finite-duration setting filter disclosed in U.S. Pat. No. 3,233,450 by the present applicant. In the processing for generating a foot position/posture trajectory by the finite-duration setting filter, a foot position trajectory, for example, is generated such that the foot 22 starts moving toward a desired landing position (a required value of the landing position) while gradually accelerating it, and then gradually decelerate its speed to zero or substantially to zero by desired landing time (a required value of landing time) so as to stop when it reaches the desired landing position at the desired landing time. The same applies to a foot posture trajectory. In the desired foot position/posture trajectory thus generated, a ground speed at a landing moment is zero or substantially zero, so that a landing impact at landing from the aforesaid floating period can be reduced especially when running the robot 1.

Figure 9:
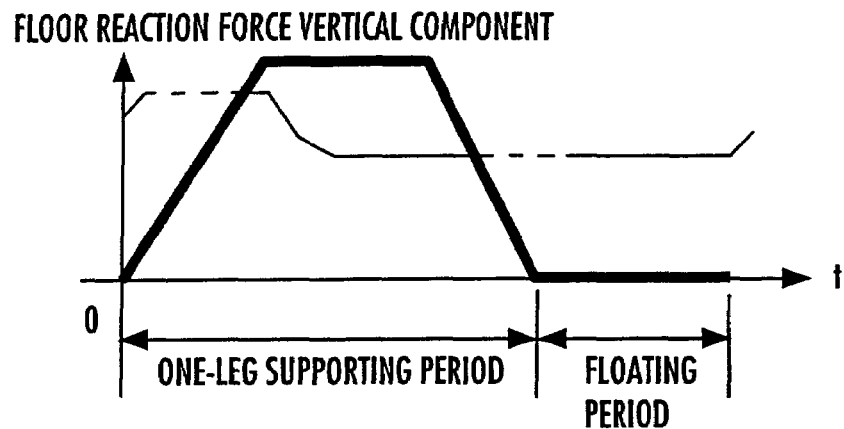
FIGS. 9 (*a*) and (*b*) are graphs showing exemplary settings of a floor reaction force vertical component of a desired gait and a desired ZMP, respectively.
Figure 9:
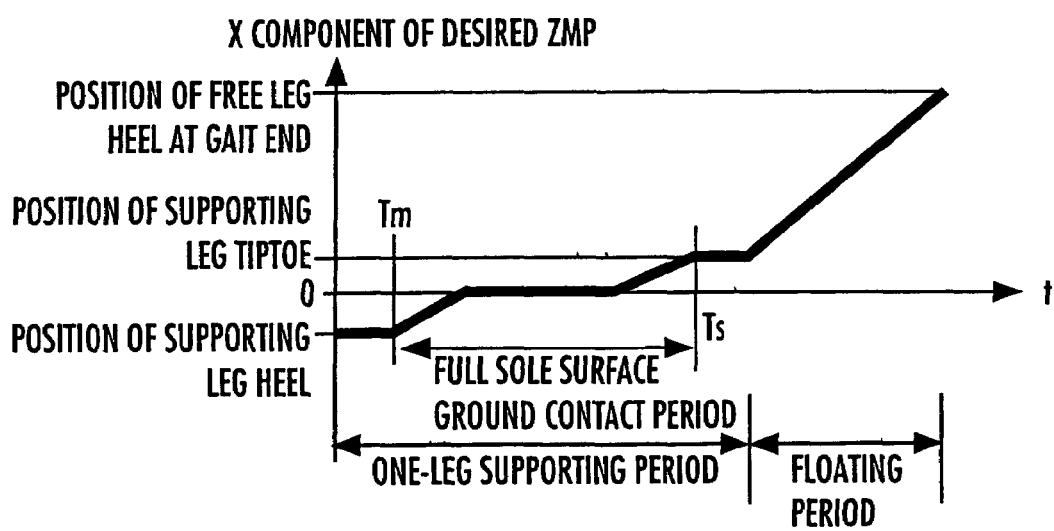

When running the robot 1 in the same manner as, for example, a human runs, a desired floor reaction force vertical component trajectory and a desired ZMP trajectory (specifically in the X-axis direction (the longitudinal direction of the supporting leg foot 22) of the supporting leg coordinate system), for example, are set by the patterns indicated by solid lines in FIG. 9(a) and FIG. 9(b), respectively.

When the robot 1 runs, a desired floor reaction force vertical component trajectory basically exhibits a pattern jutting upward in the one-leg supporting period, and maintains zero during the floating period, as indicated by the solid line in FIG. 9(a). When walking the robot 1, the desired floor reaction force vertical component trajectory is set, for example, as indicated by the two-dot chain line in FIG. 9(a). In this case, the upwardly protuberant portion of the two-dot chain line corresponds to the two-leg supporting period, while the downwardly protuberant portion corresponds to the one-leg supporting period. Regardless of whether the robot 1 is running or walking, the desired ZMP is basically set around the center in the ground contact surface (more specifically, in a so-called supporting polygon) of the leg 2 of the robot 1. The following explanation will primarily refer to a case where the robot 1 runs.

The functional construction of the control unit 60 shown in FIG. 8 is partly different from the first embodiment in PCT application PCT/JP03/00435 previously proposed by the present applicant. The functional construction differs in that a vertical body position stabilizing control calculation unit 218 and a self position/posture estimator 216 have been newly added, a model vertical external force Fmdlz, which will be discussed hereinafter, is supplied from the vertical body position stabilizing control calculation unit 218 to the gait generator 200, the model vertical external force Fmdlz is taken into account in the generation of gaits by the gait generator 200, a compliance control compensating vertical floor reaction force Fcmpnz is supplied from the vertical body position stabilizing control calculation unit 218 to a composite-compliance manipulation determiner 204, and the composite-compliance manipulation determiner 204 determines a compliance operation, considering the compliance control compensating vertical floor reaction force Fcmpnz. The rest of the mode is not different from the first embodiment in the aforesaid PCT application PCT/JP03/00435.

The aspects different primarily from the first embodiment in PCT application PCT/JP03/00435 will now be described in detail. The self position/posture estimator 216 determines an estimated vertical body position, which is an estimated value of an actual vertical position of the body 3 of the robot 1, and a vertical body positional error, which is a difference between the estimated vertical body position and a desired vertical body position, is determined. To determine an estimated body vertical positional error, the self position/posture estimator 216 may use a technique of any one of the embodiments proposed in, for example, an application (PCT application with the title of invention "Self position estimating device of legged mobile robot" whose claim of priority is based on Japanese Patent Application No. 2002-127066) filed on the same day when the present application was submitted. Alternatively, a publicly known inertial navigation technique may be used to determine an estimated vertical body position. Basically, any technique may be used as long as it allows an estimated vertical body position to be determined as accurately as possible. A desired vertical body position used to calculate the vertical body positional error is the vertical body position of a desired gait determined in a previous control cycle by the gait generator 200. The self position/posture estimator 216 of the present embodiment determines an estimated body posture as an estimated value of an actual posture of the body 3, and an actual body posture angle error, which is an inclination component (inclination component relative to a vertical axis) in a difference between the aforesaid estimated body posture and a desired body posture, is also determined. A detected acceleration value of an accelerometer provided on the inclination sensor 54 and a detected angular velocity value of a gyro sensor are supplied to the self position/posture estimator 216 to determine an estimated body position/posture or to calculate a vertical body positional error and an actual body posture angle error. Furthermore, the gait generator 200 supplies desired gaits, such as desired body position/postures, to the self position/posture estimator 216.

The vertical body position stabilizing control calculation unit 218 determines the compliance control compensating vertical floor reaction force Fcmpnz and a model vertical external force Fmdlz on the basis of the aforesaid vertical body positional error.

A force is generally represented by a combination of a translational force and a moment of the force; however, it will be assumed hereinafter that the forces represent only translational force components hereinafter unless otherwise specified.

The compliance control compensating vertical floor reaction force Fcmpnz is supplied to the composite-compliance manipulation determiner 204, including compliance control over a total floor reaction force vertical component. The composite-compliance manipulation determiner 204 determines a corrected desired foot position/posture (trajectory) with deformation compensation such that an actual total floor reaction force (a resultant force of all foot floor reaction forces) agrees with a sum (resultant force) of a total floor reaction force, which is a resultant force of individual desired foot floor reaction forces, and the compliance control compensating vertical floor reaction force Fcmpnz. In other words, the compliance control compensating vertical floor reaction force Fcmpnz is additionally generated as an actual floor reaction force.

The model vertical external force Fmdlz is sent to the gait generator 200. The gait generator 200 assumes that the model vertical external force Fmdlz acts on a robot, and generates a motion of a desired gait that satisfies dynamic balancing conditions (Newtonian equation and Euler equation) by using a dynamic model. More specifically, motions that satisfy dynamic balancing conditions are generated, assuming that gravity and the model vertical external force Fmdlz act on the center of gravity of the dynamic model.

As the dynamic model, for example, a simplified model described in the aforesaid PCT publication of unexamined application WO/02/40224 or a multi-mass point model full model) disclosed in Japanese Unexamined Patent Application Publication No. 2002-326173 proposed by the present applicant may be used.

In a follow-up control system for making an actual robot follow a desired gait composed of a desired motion and a desired floor reaction force generated so as to satisfy dynamic balancing conditions by using a dynamic model, a difference between a desired motion and a motion of an actual robot is hardly influenced by any floor reaction forces applied as long as the same floor reaction force is applied to the dynamic model and the actual robot.

This means that applying a certain floor reaction force F to an actual robot and applying a floor reaction force with a reverse sign (−F) from the floor reaction force F to the dynamic model can be said to be equivalent in terms of influences on the difference between a desired motion and a motion of the actual robot.

Floor reaction forces applied to a dynamic model are not necessarily the forces acting from a floor in contact. For example, there are cases where floor reaction forces that cannot actually be generated because of no contact between a robot and a floor are applied to the dynamic model. For this reason, the floor reaction forces may be more reasonably referred to as desired external forces than desired floor reaction forces; however, they are both theoretical forces, so that they may be called either way.

Figure 10:
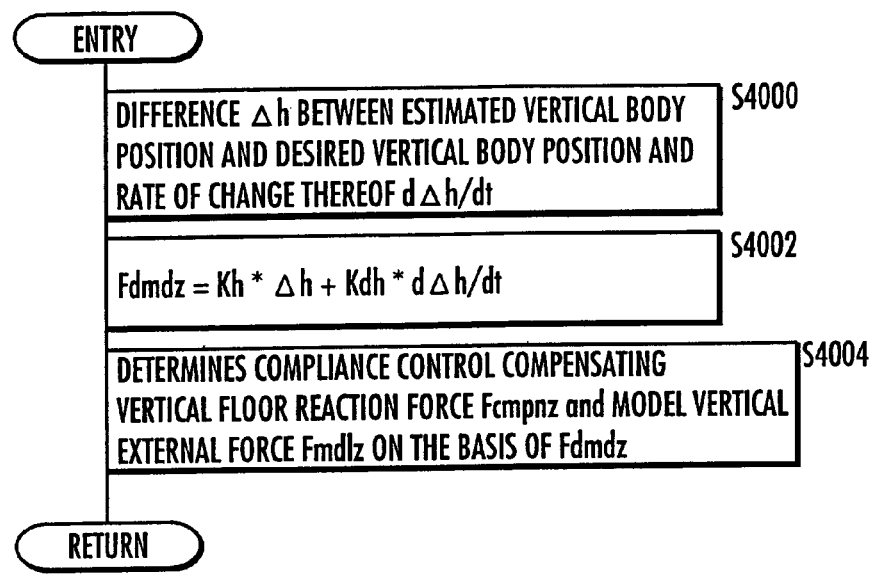
FIG. 10 is a flowchart showing processing of a control unit for stabilizing a vertical position of a body in a first embodiment.
Figure 11:
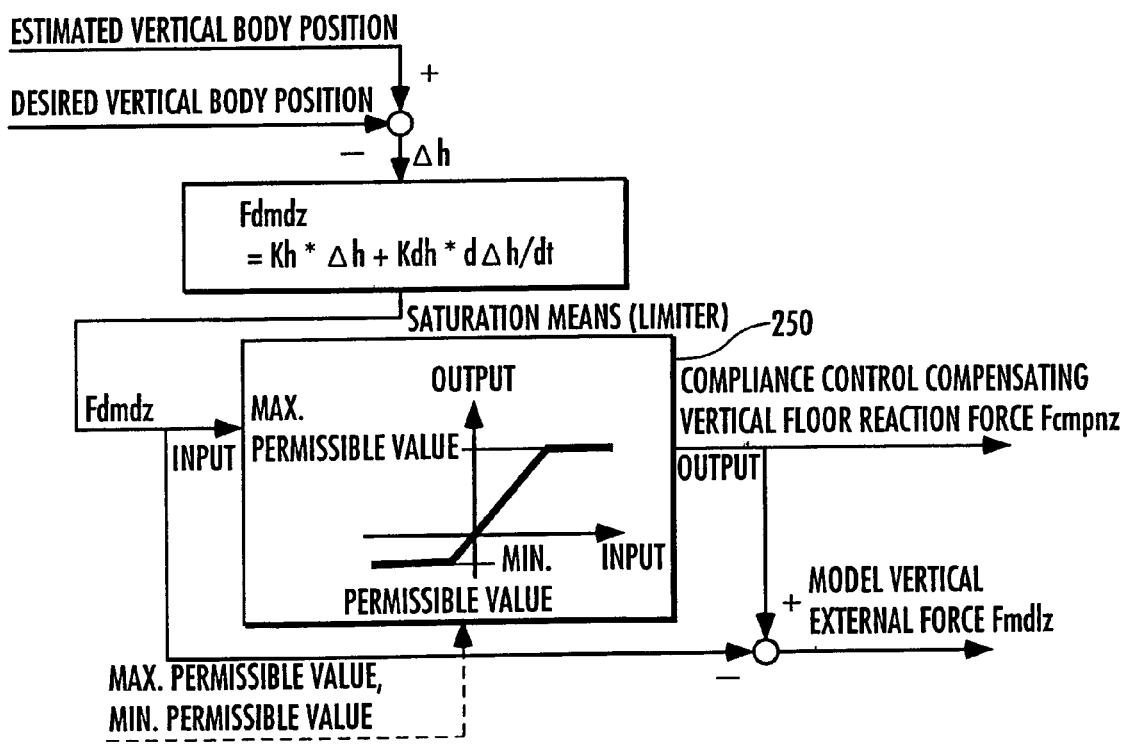
FIG. 11 is a block diagram showing details of the processing shown in FIG. 10.

Processing by the vertical body position stabilizing control calculation unit 218 will be explained in detail with reference to FIG. 10 showing a flowchart thereof and FIG. 11 showing a control block diagram thereof. First, in S4000 of FIG. 10, a difference (vertical body positional error) Δh between an estimated vertical body position and a desired vertical body position, and a rate of change thereof (temporal differential value) dΔh/dt are determined.

Then, the program proceeds to S4002 wherein an overall required vertical restoring force Fdmdz is determined according to the expression shown. More specifically, Fdmdz is determined from a vertical body positional error according to a feedback control law (PD control law in the present embodiment).

Figure 12:
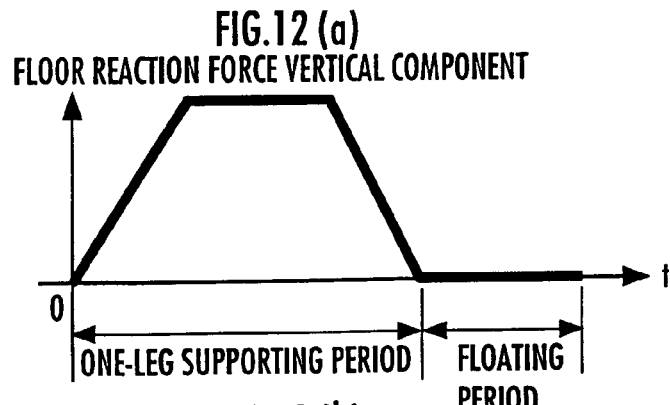
FIG. 12 (*a*) through (*d*) are graphs showing exemplary settings of a floor reaction force vertical component of a desired gait, a desired ZMP, a maximum tolerance of a compensatory vertical floor reaction force for compliance control, and a minimum tolerance of a compensatory vertical floor reaction force.
Figure 12:
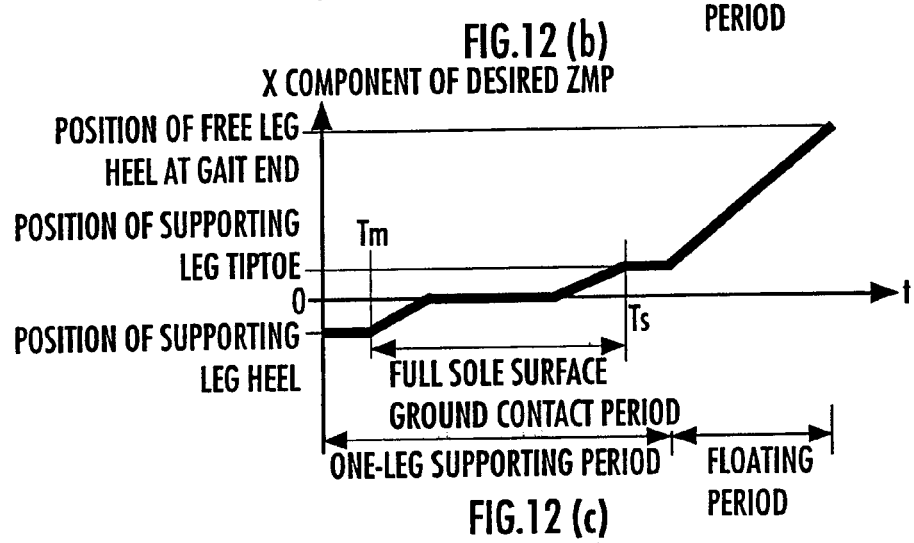
Figure 12:
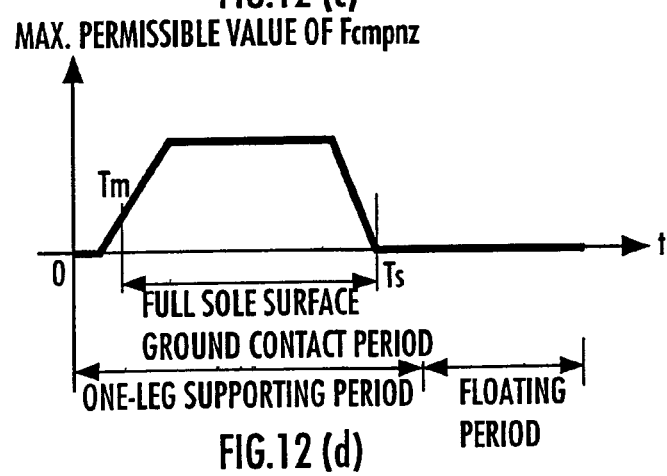
Figure 12:
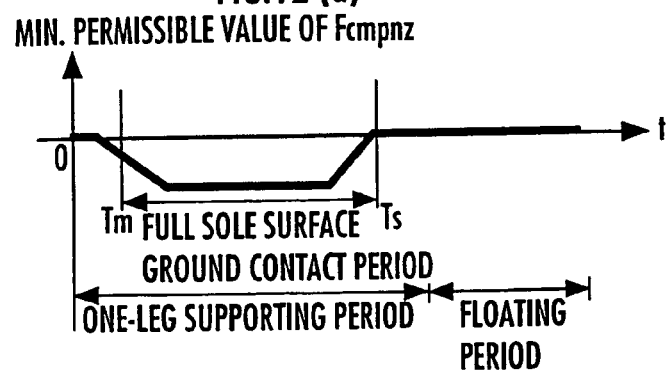

Subsequently, the program proceeds to S4004 wherein the compliance control compensating vertical floor reaction force Fcmpnz and the model vertical external force Fmdlz are determined on the basis of an overall required vertical restoring force Fdmdz. To be more specific, first, a minimum permissible value and a maximum permissible value of the compliance control compensating vertical floor reaction force Fcmpnz are set as illustrated in FIGS. 12(*c*) and (*d*), and then the overall required vertical restoring force Fdmdz is passed through a saturation means (limiter) 250 for limiting with the minimum permissible value as a lower limit value and the maximum permissible value as an upper limit, thereby determining the compliance control compensating vertical floor reaction force Fcmpnz. Hence, Fcmpnz is equal to Fdmdz if the minimum permissible value≦Fdmdz≦the maximum permissible value. If Fdmdz<the minimum permissible value or Fdmdz>the maximum permissible value, then Fcmpnz will be limited by the minimum permissible value or the maximum permissible value. Then, the overall required vertical restoring force Fdmdz is subtracted from the compliance control compensating vertical floor reaction force Fcmpnz thus determined so as to determine the model vertical external force Fmdlz. This means that Fcmpnz and Fmdlz are determined such that the difference between Fcmpnz and Fmdlz equals Fdmdz.

Complementarily, a gain Kh and a gain Kdh in S4002 are negative values and set such that the difference Δh between an estimated vertical body position and a desired vertical body position approaches (converges) zero. The values of the gains may be changed, depending upon periods, such as a one-leg supporting period or a floating period.

The minimum permissible values are non-positive values and the maximum permissible values are non-negative values, the minimum and maximum permissible values defining the permissible range of the compliance control compensating vertical floor reaction force Fcmpnz. The maximum permissible value and the minimum permissible value shown in FIGS. 12(*c*) and (*d*) are examples in a case where the robot 1 runs. In this example, the permissible range defined by the minimum permissible value and the maximum permissible value is set to zero during the period from the moment immediately before a floating period to the moment immediately after a start of a one-leg supporting period. In FIG. 12, the desired floor reaction force vertical components and the desired ZMP shown in FIGS. 9(*a*) and (*b*) have been added in FIGS. 12(*a*) and (*b*) to show temporal relationships between the minimum permissible value and maximum permissible value of Fcmpnz and the desired floor reaction force vertical components and the desired ZMP.

In a floating period, the compliance control compensating vertical floor reaction force Fcmpnz cannot be generated by compliance control, that is, the floor reaction force remains zero in a midair even if the foot 22 is perturbated by the compliance control; therefore, the minimum permissible value and the maximum permissible value of Fcmpnz are desirably set to zero or substantially zero.

It is also difficult to change floor reaction forces by perturbating a foot by the compliance control immediately before leaving a floor (immediately before a floating period begins) if the floor reaction force is small or only a tiptoe is in contact with the ground. Hence, the minimum permissible value and the maximum permissible value should be also set to zero or substantially zero immediately before leaving a floor. If the compliance control compensating vertical floor reaction force Fcmpnz takes a value other than zero immediately before leaving a floor, then the floor leaving time (the floating period starting time) at which the floor reaction force reaches zero may be shifted from a desired floor leaving time. For this reason also, the minimum permissible value and the maximum permissible value should be set substantially zero immediately before leaving the floor.

If actual time at which the robot 1 leaves a floor is earlier than desired floor leaving time, then a horizontal frictional force reduces or reaches zero before expected time, frequently causing slippage or spin to take place. Conversely, if the floor leaving time is delayed, then there has been a possibility of the free leg foot 22 being caught on a floor before moving the free leg foot 22 forward immediately after leaving the floor, as in the case of running.

According to the construction described above, the model vertical external force Fmdlz is applied during a floating period, while mainly the compliance control compensating vertical floor reaction force Fcmpnz is applied during a supporting leg period in order to gradually bring the difference between an estimated vertical body position and a desired vertical body position (vertical body positional error) Δh to zero.

In a supporting leg period, the gain Kh and the gain Kdh may be set to zero or substantially zero. This is because a floor reaction force changes according to the difference Δh between a vertical body positional error estimated vertical body position and a desired vertical body position and a differential value thereof, and the compliance control itself has an action to converge the difference Δh between an estimated vertical body position and the desired vertical body position to zero.

Figure 13:
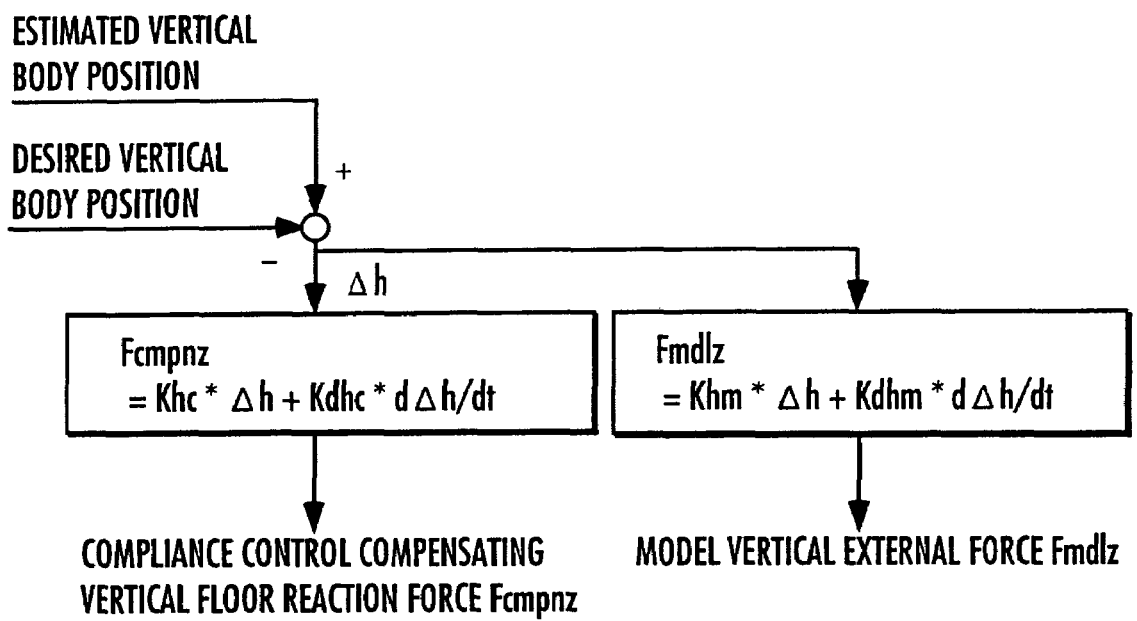
FIG. 13 is a block diagram showing another example of the processing of the control unit for stabilizing the vertical position of the body in the first embodiment.

In place of S4002 and S4004, the model vertical external force Fmdlz and the compliance control compensating vertical floor reaction force Fcmpnz may be determined using the shown expression on the basis of the difference (vertical body positional error) Δh between an estimated vertical body position and the desired vertical body position, as shown in FIG. 13. More specifically, from the vertical body positional error Δh, the model vertical external force Fmdlz and the compliance control compensating vertical floor reaction force Fcmpnz may be determined separately according to a feedback control law (PD control law in the example shown in FIG. 13). However, a value of a gain Khc (proportional gain) related to the compliance control compensating vertical floor reaction force Fcmpnz and a value of a gain Khm (proportional gain) related to the model vertical external force Fmdlz should be changed according to a period or the like, such as a one-leg supporting period or a floating period, as shown in FIGS. 14(*c*) and (*d*), respectively. More specifically, the gain Khc is preferably set to Khc≈0 at time when a floor reaction force reaches zero or substantially zero as in a floating period or immediately before the midair starts (immediately before leaving a floor) or immediately after a one-leg supporting period starts (immediately after touching a ground). Conversely, the gain Khm is preferably set to Khm≈0 in a supporting leg period. FIGS. 14(*a*) and (*b*) show the desired floor reaction force vertical components and the desired ZMP (X-axis components) shown in FIG. 9.

Considering stability, Kdhc should have a tendency similar to that of Khc, and Kdhm should have a tendency similar to that of Khm.

The vertical body position stabilizing control calculation unit 218 may combine a limiter like the saturation means 250 and a variable gain. Alternatively, a filter, such as a low-pass filter, may be inserted in the vertical body position stabilizing control calculation unit 218. Furthermore, the model vertical external force Fmdlz and the compliance control compensating vertical floor reaction force Fcmpnz may be determined using neuro-control or fuzzy control or the like.

Any construction can be used as long as the model vertical external force Fmdlz primarily acts in a floating period, while the compliance control compensating vertical floor reaction force Fcmpnz primarily acts in a supporting leg period so as to bring the difference Δh between an estimated vertical body position and a desired vertical body position close to zero.

Figure 15:
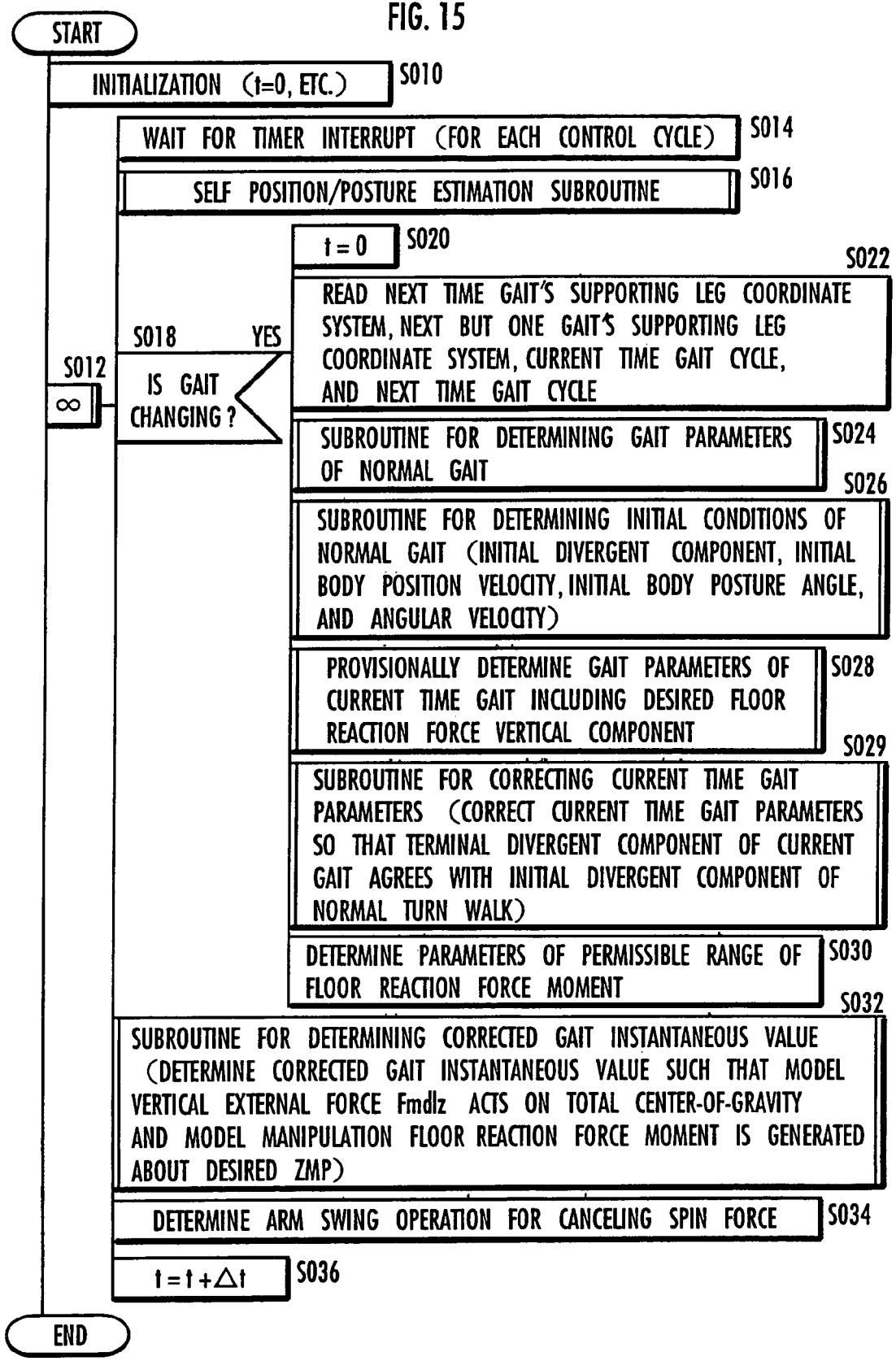
FIG. 15 is a flowchart showing processing for generating gaits and processing for estimating self position/posture in the first embodiment.

FIG. 15 shows a flowchart of processing for generating a desired gait in the gait generator 200 and processing for estimating a self position/posture of the self position/posture estimator 216.

In conjunction with the figure, the processing of the gait generator 200 and the self position/posture estimator 216 will be explained in detail.

First, various initializing operations, including initialization of time t to zero, are performed in S010.

Next, the program proceeds to S014 via S012 and waits for a timer interrupt for each control cycle. The control cycle is denoted by Δt.

Then, the program proceeds to S016 to perform the processing of the self position/posture estimator 216, that is, to estimate an actual body position/posture of the robot 1 (processing for determining an estimated body position/posture). The processing in S016 may use the technique of any one of the embodiments proposed in the application (PCT application with the title of invention "Self-position estimating device for leg type movable robots" whose claim of priority is based on Japanese Patent Application No. 2002-127066) submitted on the same day when the present application was submitted, as previously described. Alternatively, the inertial navigation technique, which is a conventional method, may be used to estimate a self position (body position/posture).

Subsequently, the program proceeds to S018 to determine whether a gait is changing (whether it is the time to start generating a new current time gait after completion of generating a last time gait). If the determination result is YES, then the program proceeds to S020. If the determination result is NO, then the program proceeds to S032. Processing after S020, which will be described hereinafter, has been explained in detail in PCT publication of unexamined application WO/02/40224 or the aforesaid PCT application PCT/JP03/00435 previously proposed by the present applicant; therefore, only a brief explanation will be given in the present description.

When proceeding to S020, time t is initialized to zero. The program then proceeds to S022 to read a next time gait's supporting leg coordinate system (specifically the position and direction), the next but one time gait's supporting leg coordinate system (specifically the position and direction), the current time gait cycle, and the next time gait cycle.

The next time gait's supporting leg coordinate system and the next but one time gait's supporting leg coordinate system are determined according to the definitions of the aforesaid supporting leg coordinate systems on the basis of a required value of a landing position/posture (desired landing position/posture) of a free leg foot 22 of a first step (the free leg foot 22 of the current time gait) and a required value of a landing position/posture (desired landing position/posture) of a free leg foot 22 of a second step (the free leg foot 22 of the next time gait) specified primarily by operating the joystick 73.

The current time gait cycle and the next time gait cycle are determined on the basis of a required value of landing time (desired landing time) of the free leg foot 22 of the first step and a required value of landing time (desired landing time) of the free leg foot 22 of the second step.

The aforesaid required values of landing position/posture and the required values of landing time of the free leg foot 22, or positions and directions in the supporting leg coordinate systems and gait cycles may be stored beforehand as walking schedules or determined on the basis of commands (requests) from a steering device, such as the joystick 73, and a walking history up to that moment.

Then, the program proceeds to S024 wherein gait parameters of a normal turning gait connected to the current time gait are determined on the basis of mainly the next time gait's supporting leg coordinate system, the next but one time gait's supporting leg coordinate system, the current time gait cycle, and the next time gait cycle determined in S022. Primarily, a foot trajectory parameter defining a desired foot position/posture trajectory, a reference body posture trajectory parameter defining a reference trajectory of a desired body posture, an arm posture trajectory parameter defining a desired arm posture trajectory, a ZMP trajectory parameter defining a desired ZMP trajectory, and a floor reaction force vertical component trajectory parameter defining a desired floor reaction force vertical component trajectory are determined. To illustrate, for example, the floor reaction force vertical component trajectory parameter, time and value of a bend point of the pattern shown in FIG. 9(a) are determined as the floor reaction force vertical component trajectory parameters.

Here, the normal turning gait means a cyclic gait that is free of discontinuity in a motional state of the robot 1 at a boundary of the gait when the gait is repeated ("normal turning gait" may hereinafter be abbreviated to "normal gait" in some cases).

A one-cycle gait of the normal turning gait is composed of a first turning gait and a second turning gait. The first turning gait corresponds to a gait in which the supporting leg foot 22 corresponding to the supporting leg coordinate system of the current time gait is moved to a position/posture corresponding to the next but one time gait's supporting leg coordinate system. The second turning gait corresponds to a gait in which the supporting leg foot 22 corresponding to the supporting leg coordinate system of the next time gait is moved to a position/posture corresponding to a next but two time gait's supporting leg coordinate system. In this case, the next but two time gait's supporting leg coordinate system corresponds to a desired landing position/posture of the free leg foot 22 of the second turning gait. Furthermore, the next but two time gait's supporting leg coordinate system is set such that the position/posture (position and direction) of the next but two time gait's supporting leg coordinate system observed from the next but one time gait's supporting leg coordinate system (the supporting leg coordinate system of the second turning gait) agrees with the position/posture (position and direction) of the next time gait's supporting leg coordinate system (landing position/posture of the free leg foot 22 of the current time gait) observed from the current time gait's supporting leg coordinate system. The term "turning" is used for normal turning gaits, because it means moving straight when a turning rate is set to zero, and moving straight can be included in turning in a broad sense.

Normal turning gaits are virtual cyclic gaits provisionally prepared to determine a divergent component at an end of the current time gait or a vertical body positional speed by the gait generator 200, and are not directly output from the gait generator 200 to actually control the robot 1.

The term "divergent" means that the position of the body shifts away from the position of the two foot portions (feet). A value of a divergent component is a numeral value indicating how far the position of the body of the bipedal mobile robot shifts from the position of the two foot portions (feet) (strictly speaking, a numeral value indicating how far it shifts from the origin of a supporting leg coordinate system set on a supporting leg ground contact surface), and it is expressed by a position of the body in the horizontal direction and a speed function thereof.

In the present embodiment, a normal gait following the current time gait to be generated is set on the basis of a move request (a landing position/posture of the foot 22 of a free leg up to the next two steps, and a required value of landing time or the like), and an initial divergent component of a normal gait is determined, and then the current time gait is generated so that a terminal divergent component of the current time gait agrees with the initial divergent component of the normal gait. The details of S024 have been explained in the aforesaid PCT publication of unexamined application WO/02/40224 or PCT/JP03/00435 proposed by the present applicant, so that any further explanation will be omitted.

After the processing of S024 is carried out to determine the gait parameters of the normal gait, the program proceeds to S026 to determine an initial state of a normal turning gait (an initial horizontal body positional velocity component, an initial vertical body positional velocity, an initial divergent component, an initial body posture angle, and an angular velocity).

The details of S026 have been explained in the aforesaid PCT publication of unexamined application WO/02/40224 or PCT/JP03/00435, so that any further explanation will be omitted.

Subsequently, the program proceeds to S028 wherein gait parameters for the current time gait are determined (some being provisionally determined). In this case, the gait parameters for the current time gait to be determined mainly include a foot trajectory parameter, a reference body posture trajectory parameter, an arm posture trajectory parameter, a desired ZMP trajectory parameter, and a desired floor reaction force vertical component trajectory parameter, as in the case of the gait parameters for a normal turning gait. The trajectories defined by the individual parameters are determined so that they continue to the trajectory of the normal turning gait. Among these parameters, however, the desired ZMP trajectory parameter is provisional. The details of the processing of S028 have been explained in the aforesaid PCT publication of unexamined application WO/02/40224 or PCT/JP02/13596, etc.; therefore, further explanation will be omitted.

Next, the program proceeds to S029 wherein a gait parameter of the current time gait is corrected so that a terminal divergent component of the current time gait agrees with an initial divergent component of a normal gait. The gait parameter corrected here is the desired ZMP trajectory parameter.

The details of S029 have been explained in the aforesaid PCT publication of unexamined application WO/02/40224 or PCT/JP02/13596, etc.; therefore, further explanation will be omitted.

Then, the program proceeds to S030 wherein parameters of a permissible range of floor reaction force moments are determined.

The details of S030 have been explained in PCT/JP02/13596, so that any further explanation will be omitted.

After the processing in S030 is carried out, or if a determination result of S018 is NO, then the program proceeds to S032 to determine a current time gait instantaneous value.

In S032, a gait instantaneous value (corrected gait instantaneous value) is determined for the dynamic model of the robot 1 such that a model manipulation floor reaction force moment is generated about a desired ZMP in addition to a desired floor reaction force (the floor reaction force of a desired gait), and the model vertical external force Fmdlz acts on the total center of gravity of the dynamic model of the robot 1.

Specifically, the gait instantaneous value is determined according to the flowchart shown in FIG. 16.

This will be explained below.

From S900 through S904, based on the current time gait parameters finally determined by the processing of the aforesaid S029, instantaneous values of a desired floor reaction force vertical component, a desired ZMP, desired positions/postures of two feet, a reference body posture, and desired arm postures at present time t are determined. The processing from these steps S900 through S904 is the same as that of S900 through S904 of the flowchart in an embodiment explained in detail in, for example, PCT application PCT/JP02/13596 proposed previously by the present applicant. Hence, detailed explanation will be omitted.

In S904, the desired positions/postures of the two feet at time t determined on the basis of the gait parameters are described in terms of a current time gait's supporting leg coordinate system (the supporting leg coordinate system determined as described above, corresponding to a landing position/posture of the supporting leg foot 22 of the current time gait).

Complementarily, a desired foot position/posture trajectory is generated using the finite-duration setting filter proposed in U.S. Pat. No. 3,233,450 by the present applicant, as described above. Hence, at the moment the robot 1 touches the ground from a floating period while running, the robot 1 lands by pulling up the foot 22, as observed from the body 3, so that the ground speed reaches zero or substantially zero. This reduces a landing impact, making it possible to prevent undue landing impacts.

Preferably, the finite-duration setting filter is set to a tertiary or higher order, i.e., the filter preferably has three or more stages of first-order lag filters of a variable time constant that are arranged in series. This arrangement causes velocity and acceleration to reach zero or substantially zero by landing time (desired landing time) at a stop. In other words, the ground acceleration also reaches zero or substantially zero at the moment of landing. Therefore, a landing impact is further reduced. In particular, an impact will not increase much even if landing time of the actual robot 1 deviates from desired landing time.

Instead of using finite-duration setting filters, functions, such as polynomials, set such that changing speed at landing time (reaching time) is zero or substantially zero (temporal differential value reaches zero) may be used to determine a foot position/posture trajectory.

After carrying out the processing of S900 through S904, the program proceeds to S906 to calculate an total center-of-gravity vertical position to dynamically match a resultant force of a desired floor reaction force vertical component and the model vertical external force Fmdlz determined by the vertical body position stabilizing control calculation unit 218, as described above.

More specifically, expression 1 given below is used to determine an total center-of-gravity vertical acceleration that dynamically (in a manner of Newtonian mechanics) matches when a resultant force of a desired floor reaction force vertical component and the model vertical external force Fmdlz acts on the dynamic model of the robot 1. Furthermore, the determined total center-of-gravity vertical acceleration is integrated using expression 2 given below to determine an total center-of-gravity vertical velocity at time t. Then, the determined total center-of-gravity vertical velocity is integrated using expression 3 to calculate an total center-of-gravity vertical position at time t. Here, a gravitational acceleration takes a negative value. In place of expression 2 and expression 3, trapezoidal approximation may be used to determine vertical positions and velocities of overall centers of gravity.

Total center-of-gravity vertical acceleration at time $t$=Gravitational acceleration+(Desired floor reaction force vertical component+Model vertical external force $Fmdlz$)/Overall mass    Expression 1

Total center-of-gravity vertical velocity at time $t$=Total center-of-gravity vertical velocity at time $(t-\Delta t)$+ Total center-of-gravity vertical acceleration*$\Delta t$ at time $t$ (where the gravitational acceleration takes a negative value)    Expression 2

Total center-of-gravity vertical position at time $t$=Total center-of-gravity vertical position at time $(t-\Delta t)$+ Total center-of-gravity vertical velocity*$\Delta t$ at time $t$    Expression 3

Then, the program proceeds to S908 to calculate a vertical body positional velocity that satisfies an total center-of-gravity vertical positional velocity. To be more precise, the vertical body positional velocity is determined such that the total center-of-gravity vertical positional velocity of a posture determined on the basis of the determined desired positions/ postures of two feet (values at time t), a desired body posture at time (t−Δt), the determined desired arm postures (values at time t), a horizontal body position at time (t−Δt), and rates of change thereof (changing velocities) and a vertical body positional velocity to be determined agrees with a current value (the value at time t) of the determined total center-of-gravity vertical positional velocity.

The body posture and the horizontal body position at time t have not yet been determined, so that the values of time (t−Δt) have been used instead. To further improve accuracy, the body posture, the horizontal body position, and estimated values at time t may be determined by extrapolation on the basis of a gait state before the time (t−Δt).

The program then proceeds to S910 to determine a floor reaction force horizontal component permissible range [Fxmin, Fxmax] at time t on the basis of the gait parameters. The gait parameters defining the floor reaction force horizontal component permissible range are determined in the above S028. This, however, has been described in PCT application PCT/JP02/13596 proposed previously by the present applicant. Hence, any further explanation will be omitted.

Subsequently, the program proceeds to S911 to determine an instantaneous value of a floor reaction force moment permissible range on the basis of floor reaction force moment permissible range parameters. The floor reaction force moment permissible range is sent to a compensating total floor reaction force moment distributor 214 shown in FIG. 8. The compensating total floor reaction force moment distributor 214 basically determines a desired floor reaction force moment for compliance control and a model manipulation floor reaction force moment to be input to a dynamic model of the gait generator 200 such that a body posture (estimated body posture) of the robot 1 is brought close to a desired body posture. The details thereof are given in PCT/JP03/00435 previously proposed by the present applicant. Hence, further explanation will be omitted.

Subsequently, the program proceeds to S912 wherein horizontal body acceleration and a body posture angular acceleration of a current time gait are determined so that the model manipulation floor reaction force moment (which is determined by the compensating total floor reaction force moment distributor 214) is generated about a desired ZMP. At this time, the horizontal body acceleration and the body posture angular acceleration are determined so that a floor reaction force horizontal component Fx does not exceed the floor reaction force horizontal component permissible range [Fxmin, Fxmax].

In other words, a combination of the horizontal body acceleration and the body posture angular acceleration of the current time gait is determined such that the moment acting about the desired ZMP by a resultant force of an inertial force produced by a desired motion of a robot 1 and gravity becomes a moment with a sign reversed from that of the model manipulation floor reaction force moment. It is determined, however, such that the force with a sign reversed from that of an inertial force does not exceed the floor reaction force horizontal component permissible range [Fxmin, Fxmax].

This has been also described in the PCT application PCT/JP02/13596 previously proposed by the present applicant, so that no further explanation will be given.

The program then proceeds to S914 to integrate the horizontal body acceleration and the body posture angular acceleration, respectively, to calculate the horizontal body velocity and the body posture angular velocity, and these are further integrated to determine a horizontal body position and a body posture angle.

After carrying out the processing of S032 as described above, the program proceeds to S034 to determine an arm swinging manipulation for canceling a spinning force, as in the processing of S032 in an embodiment of the PCT application PCT/JP02/13596. The program then proceeds to S036 to add a control cycle Δt to time t, and goes back to S014 again to wait for a timer interrupt for each control cycle.

The above has described the processing for generating a desired gait in the gait generator 200, and the processing for estimating a self position/posture of the self position/posture estimator 216.

Referring to FIG. 8, the control processing of the control unit 60 according to the present embodiment will be further explained. A desired gait is generated in the gait generator 200 as described above. A desired body position/posture (trajectory) and a desired arm posture trajectory in the generated desired gait are directly sent to a robot geometric model (inverse kinematics calculation unit) 202.

The desired foot position/posture (trajectory), the desired ZMP trajectory (desired total floor reaction force central point trajectory), and a desired total floor reaction force (trajectory) (a desired floor reaction force horizontal component and a desired floor reaction force vertical component) are directly sent to the composite-compliance manipulation determiner 204 and also sent to the desired floor reaction force distributor 206. In the desired floor reaction force distributor 206, the desired total floor reaction force is distributed to the respective feet 22R and 22L to determine a desired foot floor reaction force central point for each foot and a desired foot floor reaction force for each foot. The desired floor reaction force central point for each foot and the desired floor reaction force for each foot that have been thus determined are sent to the composite-compliance manipulation determiner 204.

The composite-compliance manipulation determiner 204 generates a corrected desired foot position/posture trajectory with deformation compensation, and sends it to the robot geometric model 202. Upon receipt of the desired body position/posture (trajectory) and the corrected desired foot position/posture (trajectory) with deformation compensation, the robot geometric model 202 calculates joint displacement commands (values) for twelve joints (10R(L), etc.) of the legs 2, 2 that satisfy them and sends the commands (values) to a displacement controller 208. The displacement controller 208 uses the joint displacement commands (values) calculated by the robot geometric model 202 as the desired values to carry out follow-up control on the displacements of the twelve joints of the robot 1.

A floor reaction force generated on the robot 1 (to be more precisely, an actual floor reaction force of each foot) is detected by the six-axis force sensor 50. The detected value is sent to the composite-compliance manipulation determiner 204. Furthermore, inclination components in the difference between the estimated body posture determined in S016 shown in FIG. 15 described above and the desired body posture generated by the gait generator 200, namely, actual body posture angle errors θerrx, θerry, are sent to the posture stabilizing control calculation unit 212. θerrx denotes an inclination component in the rolling direction (about the X-axis), while θerry denotes an inclination component in the pitching direction (about the Y-axis). The posture stabilizing control calculation unit 212 calculates a compensating total floor reaction force moment Mdmd about a desired total floor reaction force central point (desired ZMP) for setting the inclination of the body posture of the robot 1 back to the inclination of the body posture of a desired gait, and the compensating total floor reaction force moment Mdmd is supplied to the compensating total floor reaction force moment distributor 214. The distributor 214 breaks up the compensating total floor reaction force moment Mdmd into a desired floor reaction force moment for compliance control and a model manipulation floor reaction force moment, and supplies them to the composite-compliance manipulation determiner 204 and the gait generator 200, respectively. Furthermore, the compliance control compensating vertical floor reaction force Fcmpnz determined as described above by the vertical body position stabilizing control calculation unit 218 is supplied to the composite-compliance manipulation determiner 204. The composite-compliance manipulation determiner 204 corrects a desired foot position/posture on the basis of an input value. More specifically, the composite-compliance manipulation determiner 204 corrects the desired foot position/posture supplied from the gait generator 200 such that an actual total floor reaction force (a resultant force of all actual foot floor reaction forces, including both translational forces and moments) agrees with a resultant force of a desired total floor reaction force, which is a resultant force of a desired floor reaction force of each foot, the compensating vertical floor reaction force for compliance control Fcmpnz and a desired floor reaction force moment for the compliance control, thereby determining a corrected desired foot position/posture (trajectory) with deformation compensation. In other words, the compliance control compensating vertical floor reaction force Fcmpnz is additionally generated, and the compliance control floor reaction force moment is also additionally generated about a desired ZMP. However, it is actually impossible to make every state agree with a goal, so that trade-off relationships are provided among them to reach compromisingly closest possible agreement. In other words, a control error on each goal (goals on a foot position/posture and a floor reaction force) is weighted, and control is carried out such that weighting average of a control error (or the square of a control error) is minimized.

Complementarily, the corrected desired foot position/posture (trajectory) with deformation compensation is a desired foot position/posture (trajectory) obtained by determining a deformation amount of a foot deformation mechanism (a columnar rubber, a foot sole sponge, and a shock-absorbing bag-shaped air damper) necessary for generating a desired value of a floor reaction force corrected by the composite-compliance manipulation determiner 204 by using a dynamic model (a spring damper model or the like) of the deformation mechanism, and then making a correction so that the deformation amount is generated.

The first embodiment explained above is an embodiment of the first invention, and of the third to the seventeenth invention. Complementarily, the model vertical external force Fmdlz corresponds to a virtual external force, while the compliance control compensating vertical floor reaction force Fcmpnz corresponds to a desired floor reaction force correction amount.

A second embodiment of the present invention will now be explained with reference to FIG. 17 and FIG. 18. In the second embodiment, the processing of the gait generator 200 differs from the first embodiment only in the corrected gait instantaneous value determining subroutine of S032 of FIG. 15. The gait generator 200 does not use the model vertical external force Fmdlz, so that only the compliance control compensating vertical floor reaction force Fcmpnz is determined in the processing of the vertical body position stabilizing control calculation unit 218 in the same manner as that of the first embodiment, and the model vertical external force Fmdlz is not output. Processing of the control unit 60 other than that is identical to the first embodiment.

Figure 17:
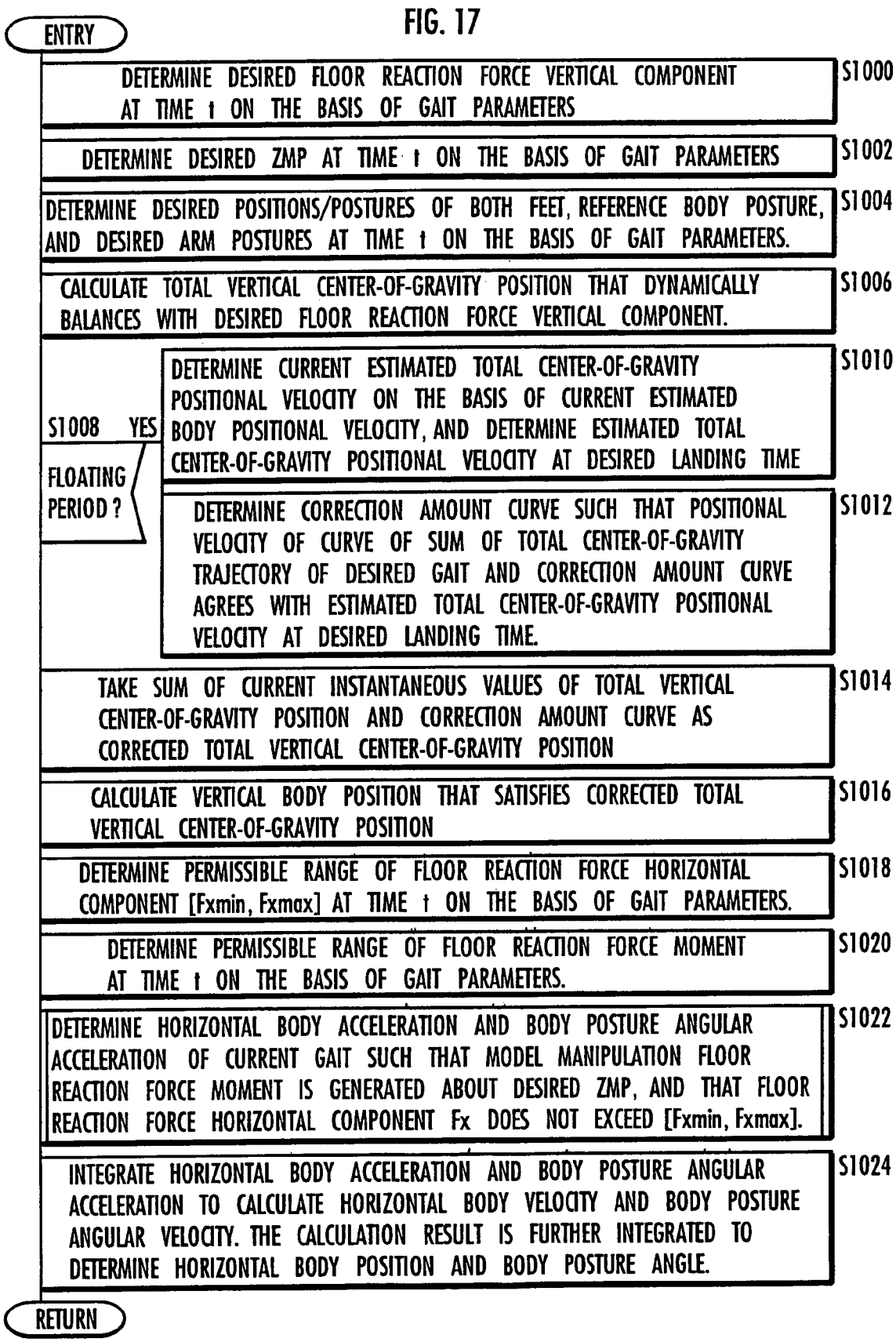
FIG. 17 is a flowchart showing processing of an essential section in a second embodiment, and FIGS. 18 (a) and (b) are graphs for explaining the processing shown in FIG. 17.

FIG. 17 is a flowchart illustrating a subroutine (the subroutine of S032 of FIG. 15) for determining a corrected gait instantaneous value (a current time gait instantaneous value) in the second embodiment.

The following will explain in detail the subroutine for determining a corrected gait instantaneous value in the second embodiment. First, the same processing in S900 through S904 in FIG. 16 of the first embodiment is carried out for S1000 through S1004.

The program then proceeds to S1006 to calculate an total center-of-gravity vertical position such that it dynamically matches a desired floor reaction force vertical component (a current value at time t). This processing is the same as the processing carried out when Fmdl=0 in S906 of FIG. 16 in the first embodiment.

Next, the program proceeds to S1008 wherein it is determined if the period is a floating period. This is determined by checking, for example, whether a detected floor reaction force value (actual floor reaction force) by the six-axis force sensor 50 is a predetermined value (a value in the vicinity of zero) or less. Alternatively, it may be determined whether the period is a floating period or not by checking whether the current time t lies in a range from the floor leaving time (start time of a floating period) of a desired gait or predetermined time before or after that to landing time of the desired gait or predetermined time before or after that.

If the determination result in S1008 is YES, then the program proceeds to S1010 to determine an estimated center of gravity positional velocity, which is an estimated value of the current total center-of-gravity positional velocity of the robot 1, on the basis of an estimated current body position and an estimated body velocity, which is a temporal rate of change thereof. Then, an estimated center of gravity positional velocity at desired landing time is determined on the basis of the estimated current center of gravity positional velocity, assuming that the total center of gravity of the robot 1 takes a parabolic motion from gravitation.

Then, the program proceeds to S1012 to determine a correction amount curve such that a positional velocity of a curve of a sum of a predicted trajectory of an total center-of-gravity trajectory (to be specific, an total center-of-gravity vertical component trajectory) of an original desired gait after the current time, the predicted trajectory being obtained if a correction (a correction in a floating period) based on a correction amount curve explained below were not made, and a correction amount curve (i.e., a vertical component trajectory of a desired total center-of-gravity position after the correction) agrees with the estimated total center-of-gravity positional velocity (to be more precise, a vertical component thereof) at desired landing time. To be more specific, the original desired gait is a gait determined by using the desired total center of gravity vertical position determined in S1006 as it is (assuming that a corrected total center-of-gravity vertical position in S1016 to be discussed hereinafter is identical to an total center-of-gravity vertical position in S1006). The predicted trajectory of the total center-of-gravity trajectory of the original desired gait is a parabola connected to the total center-of-gravity vertical position determined in S1006 of the control cycle of the current time and the velocity thereof (temporal rate of change).

More specifically, the correction amount curve is determined as described below. The explanation will be given with reference to FIG. 18. First, if the current time t is the time when a floating period begins (the time at which a determination result in S1008 switches from NO to YES), then a correction amount curve (referred to as a first correction amount curve in this case) is determined, as shown at the bottom of FIG. 18(a). The first correction amount curve added to the total center-of-gravity position trajectory (a predicted trajectory after the current time) of the original desired gait provides a corrected total center-of-gravity position trajectory (referred to as the first corrected total center-of-gravity position trajectory in this case) after the current time, which is indicated by a solid line. The first correction amount curve is determined so that the corrected total center-of-gravity position trajectory smoothly connects to the total center-of-gravity position trajectory of the original desired gait at the start time of a floating period (the total center-of-gravity vertical position and the velocity agree), and smoothly connects to the estimated total center-of-gravity trajectory at an end time of the floating period (desired landing time)(the vertical position and the velocity agree).

Next, when the current time advances by the control cycle Δt, a second correction amount curve as a new correction amount curve is determined, as shown in FIG. 18(b). The control cycle Δt in the figure is drawn to be a longer time interval than an actual time interval for the convenience of explanation.

In general, the predicted trajectory of the estimated total center-of-gravity position trajectory after the current time will not be identical to the estimated center of gravity position trajectory predicted at the time of a previous control cycle because of an estimation error or the like of an estimated body position/posture. Hence, in the present embodiment, the correction amount curve is updated for each control cycle. A new correction amount curve (a second correction amount curve) is determined such that it smoothly connects to the first correction amount curve (the correction amount curve determined in the previous control cycle) at the current time (the value of the second correction amount curve and a temporal differentiation value at the current time agrees with the first correction amount curve), and the corrected total center-of-gravity position trajectory (referred to as a second corrected total center-of-gravity position trajectory in the figure) obtained by adding the second correction amount curve to a predicted trajectory after the current time of the total center-of-gravity position trajectory of the original desired gait smoothly connects with an estimated total center-of-gravity trajectory at an end time of a floating period (desired landing time). Thereafter, the correction amount curve is updated and determined for each control cycle in the same manner. The correction amount curve is determined, using a trigonometric function or a high-order function, so that it exhibits a smooth curve (S-shaped curve).

After S1012 or if a determination result of S1008 is NO (not a floating period), the program proceeds to S1014, and the sum of an total center-of-gravity vertical position and a current instantaneous value of a current correction amount curve is taken as a corrected total center-of-gravity vertical position. The value of the correction amount curve at time other than a floating period is to be zero.

The program then proceeds to S1016 to calculate a vertical body position that satisfies a corrected total center-of-gravity vertical position by using a current desired foot position or a geometric model of the robot 1. Then, the same processing as that from S910 through S914 of FIG. 16 in the first embodiment is carried out for S1018 through S1024.

The above has described the processing of the subroutine for determining a corrected gait instantaneous value in the second embodiment. In the second embodiment, during a floating period, the total center-of-gravity vertical position trajectory of a desired gait is determined (corrected) such that the difference between the total center-of-gravity vertical position of the desired gait and an estimated total center-of-gravity vertical position corresponding to an estimated vertical body position approaches zero at future floating period end time, i.e., at an end of the current time gait. As a result, the desired vertical body position trajectory is also determined so that it approaches the trajectory of the estimated vertical body position at the end of the current time gait.

The second embodiment explained above is an embodiment of the second invention of the present invention.

A third embodiment of the present invention will now be explained with reference to FIG. 19. The present embodiment differs from the first embodiment only in the processing by the gait generator 200.

Figure 19:
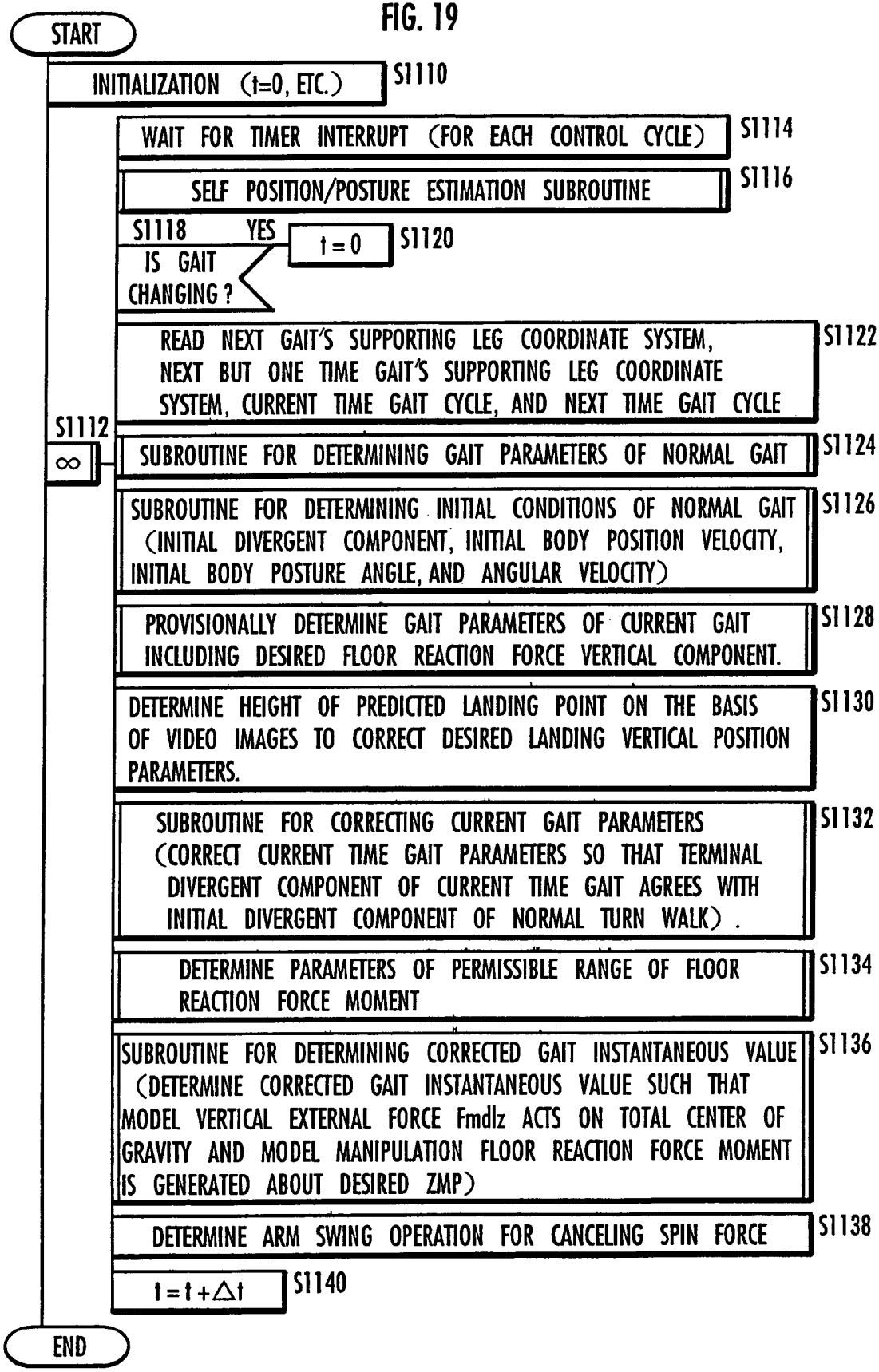
FIG. 19 is a flowchart showing processing for generating gaits and processing for estimating self position/posture in a third embodiment.

FIG. 19 shows a flowchart of the processing for generating a desired gait by the gait generator 200 and the processing for estimating a self position/posture by the self position/posture estimator 216 in the third embodiment.

First, in S1110, various initializing operations, such as initializing time t to zero, are performed.

Next, the program proceeds to S1114 via S1112 and waits for a timer interrupt for each control cycle. The control cycle is denoted by Δt.

The program then proceeds to S1116 to carry out the processing for estimating a self position/posture by the self position estimator 216 so as to estimate a body position/posture (determine an estimated body position/posture), as in S016 of FIG. 15 in the first embodiment.

Subsequently, the program proceeds to S1118 to determine whether a gait is changing. If the determination result is YES, then the program proceeds to S1120.

When the program proceeds to S1120, time t is reset to zero.

If the determination result in S1118 is NO, and if S1120 has been carried out, then the program proceeds to S1122. From S1122 through S1128, the same processing as that from S022 through S028 of FIG. 15 in the first embodiment is carried out.

Then, the program proceeds to S1130 to determine the height (vertical position) of a predicted landing point of the free leg foot 22 of the current time gait (a point on a floor surface that corresponds to a desired landing position of the free leg foot 22 of the current time gait, and it is a point on the floor surface that is substantially at the same horizontal position as the horizontal position of a desired landing position in, for example, a current time gait's supporting leg coordinate system) on the basis of images of the two video cameras 125, 125 mounted on the head 4 and a current estimated body position/posture, and then to correct the desired landing vertical position out of the desired gait parameters. The processing for determining the height of the predicted landing point in S1130 corresponds to a floor shape recognizing means in a twenty-third invention of the present invention.

More specifically, the value of the height (vertical position) of the predicted landing point determined on the basis of the video camera images or a value obtained by passing the determined value of the height through a low-pass filter is substituted into a desired landing vertical position (this is a gait parameter defining a foot position/posture trajectory of the free leg of the current time gait) among the desired gait parameters. The video camera images and the estimated body position/posture have high noises (detected values considerably vary); therefore, if the height value of the predicted landing point is directly substituted into the desired landing vertical position without passing it through a low-pass filter, then the foot position/posture trajectory of the free leg may severely fluctuate. For this reason, the height value should be passed through a low-pass filter.

In replace of using the low-pass filter, high-frequency noises may be reduced by averaging based on video camera images captured over a plurality of control cycles and an estimated body position/posture.

Next, the program proceeds to S1132 to correct the current time gait parameters, as in S029 of FIG. 15 in the first embodiment, and then proceeds to S1134 to determine the parameters of a floor reaction force moment permissible range, as in S030 of the first embodiment. The program then proceeds to S1136 to execute a subroutine for determining a corrected gait instantaneous value, as in S032 of FIG. 15 in the first embodiment. The program then proceeds to S1138 to determine an arm swinging manipulation for canceling a spinning force, as in S034 of the first embodiment. The program then proceeds to S1140 to add the control cycle Δt to time t, and returns to S1114 again to wait for a timer interrupt for each control cycle.

The above describes the processing by the gait generator 200 and the self position/posture estimator 216 in the third embodiment. In the present embodiment, in S1122, the vertical position of a next time gait's supporting leg coordinate system and the vertical position of a next but one time gait's supporting leg coordinate system are set to the vertical position of a predicted landing point determined in S1130 of the previous control cycle. However, it is not required to always set the vertical position of a next but one time gait's supporting leg coordinate system.

Instead of the video cameras 125, 125, non-contact type sensors that recognize distances (or distance distribution or shapes), such as laser range finders or ultrasonic distance meters (scanners), or tactile sensors may be used to find vertical positions of predicted landing points.

As described above, in the third embodiment, regarding a difference between an actual vertical body position trajectory (the trajectory of an estimated vertical body position) of the robot 1 and a desired vertical body position trajectory, the model vertical external force Fmdlz is added to a dynamic model so as to converge the difference (the vertical body positional error Δh) to zero, as in the first embodiment. For unexpected ruggedness of a floor, a floor surface shape recognizing sensor (distance sensor), such as a video camera, which contactlessly measures the height of a floor surface, is used to measure the floor surface height at a predicted landing point that corresponds to a desired landing position of the free leg foot 22. Based on the measured floor surface height (by the difference between the desired landing vertical position and the vertical position of the floor surface), the foot position trajectory of a free leg is corrected. This means that the desired landing vertical position (parameter) out of the gait parameters defining the foot position/posture trajectory is corrected.

In S1136 of the third embodiment, in place of the subroutine processing shown in FIG. 16 of the first embodiment, the subroutine processing shown in FIG. 17 of the second embodiment may be carried out to correct a desired total center-of-gravity vertical position trajectory or a desired vertical body position trajectory so that the total center-of-gravity vertical position trajectory or the vertical body position trajectory of a desired gait converges to an estimated value of a center of gravity position or a body position in the future (at landing) of the actual robot 1 predicted on the basis of an estimated body position in a floating period.

As a method for correcting a foot position/posture trajectory, a smooth (S-shaped curve) correction trajectory determined on the basis of the difference between the measured floor surface height (the vertical position of a predicted landing point) and the landing height (the desired landing vertical position) presumed in a desired gait may be added to a desired foot position/posture trajectory, thereby correcting the foot position/posture trajectory.

The third embodiment explained above is an embodiment of the twenty-third invention and the twenty-fourth invention.

In the embodiments explained above, gaits may be generated by kinetics calculation, considering, for example, an inertial force and a positional change in the center of gravity produced when the foot 22 is displaced in a vertical direction by compliance control.

A compliance gain (ratio of a foot perturbation displacement amount to a floor reaction force vertical component) may be made variable. For instance, the compliance gain may be determined such that compliance control is soft at landing and then the compliance control gradually becomes harder thereafter until floor leaving time is reached. Thus, if a floor is hard, an actual body positional velocity of the robot 1 when leaving the floor is close to a body positional velocity of a desired gait. If the compliance control in the vertical direction is not used (in other words, if the compliance control in the vertical direction is extremely hard), then a kicking force at a jump tends to be significantly influenced by the hardness of the floor. Hence, the compliance control in the vertical direction should not be too hard.

If the compliance gain is abruptly changed when there is a large positional error of the foot 22, the error will suddenly return to zero, so that a sudden acceleration or deceleration results. This may lead to an excessive position control error of a knee of the leg 2, causing the robot 1 to disturb its posture or a knee torque to grow excessively, and may cause damage in some cases. For this reason, the compliance gain should be gradually changed.

The technology for making the compliance gain variable is an embodiment of the twenty-sixth invention of the present invention.

In the first and the second embodiments, the current time gait parameters have been determined or corrected only when gait changes. Alternatively, however, the current time gait parameters may be corrected at predetermined time, such as at floor leaving time, or for each control cycle. However, the processing for correcting the current time gait parameters carries out S024 through S030 without carrying out the processing of S022 of FIG. 15 if a gait is not changing.

The processing of S024 through S030 in FIG. 15 also corrects the floor reaction force vertical component pattern (to be more precise, a gait parameter defining it) of the current time gait. At this time, the floor reaction force vertical component pattern of the next normal gait may be also corrected.

For each control cycle or at a gait change, the posture of the robot 1 at the next landing may be predicted on the basis of an estimated vertical body positional velocity or the difference between the estimated vertical body positional velocity and the desired vertical body positional velocity, and then a landing time parameter (desired landing time) may be changed so that the predicted posture will be a proper posture, that is, the body 3 will be neither too high (the knees will be excessively stretched) nor too low (the knees will be excessively bent). As a result, however, the posture of the robot 1 will tilt, so that parameters or the like, such as a desired ZMP and a desired landing position, which influence the posture must be changed at the same time.

In the first embodiment or the third embodiment, the model vertical external force Fmdlz may act on the desired ZMP rather than the center of gravity of a dynamic model.

Furthermore, in the above embodiments, the floor reaction forces to be added as the desired values of compliance control have included only vertical components, such as the compliance control compensating vertical floor reaction force Fcmpnz. Alternatively, however, horizontal components may be also included. For example, a floor reaction force may be added in the direction of a segment connecting an total center-of-gravity of the robot 1 and the desired ZMP or in the direction of a segment connecting a predetermined point of the body 3 and the desired ZMP. This makes it possible to prevent adverse influences that disturb the posture of a robot by a compliance manipulation.

In the first and the third embodiments, the external forces virtually applied to the dynamic models have included only vertical components, such as the model vertical external force Fmdlz. Alternatively, however, horizontal components may be also included. For example, a floor reaction force may be added in the direction of a segment connecting a total center of gravity of the robot 1 and the desired ZMP or in the direction of a segment connecting a predetermined point of the body 3 and the desired ZMP. This will prevent the desired ZMP from shifting caused by the application of the model vertical external force Fmdlz.

Applying a virtual external force to a model so that the moment of a force acting about a total center of gravity becomes zero, that is, virtually applying a model external force, which is a translational force, to the total center of gravity of a dynamic model is equivalent to changing the magnitude and/or the direction of the gravity acting on the dynamic model.

In the vertical body position stabilizing control calculation unit 218, the compliance control compensating vertical floor reaction force Fcmpnz and the model vertical external force Fmdlz may be determined on the basis of an total center-of-gravity vertical positional error (the difference between an estimated total center-of-gravity vertical position and a desired total center-of-gravity vertical position) instead of determining the compliance control compensating vertical floor reaction force Fcmpnz and the model vertical external force Fmdlz on the basis of a vertical body positional error (the difference Δh between an estimated vertical body position and a desired vertical body position).

In the vertical body position stabilizing control calculation unit 218, the compliance control compensating vertical floor reaction force Fcmpnz, the model vertical external force Fmdlz, or a correction amount of a desired vertical body position trajectory has been determined on the basis of the difference between an estimated vertical body position and a desired vertical body position; they may, however, be determined on the basis of a predetermined part (e.g., the head 4) other than the body 3.

In the above embodiments, only the control regarding the vertical components (the Z components) has been explained. Alternatively, however, the similar control may be conducted on horizontal components (X components and Y components). For example, a virtual horizontal translational external force may be applied to the center of gravity of a dynamic model on the basis of the difference between an actual center of gravity horizontal positional velocity and a desired center of gravity horizontal positional velocity when leaving a floor.

The vertical body position stabilizing control calculation unit 218 may determine only the model vertical external force Fmdlz.

For instance, as explained in the first embodiment, the vertical body position stabilizing control calculation unit 218 may determine the model vertical external force Fmdlz and the compliance control compensating vertical floor reaction force Fcmpnz, and then re-determine the compliance control compensating vertical floor reaction force Fcmpnz to zero.

Conversely from the above, the vertical body position stabilizing control calculation unit 218 may determine only the compliance control compensating vertical floor reaction force Fcmpnz.

For instance, as explained in the first embodiment, the vertical body position stabilizing control calculation unit 218 may determine the model vertical external force Fmdlz and the compliance control compensating vertical floor reaction force Fcmpnz, and then re-determine the model vertical external force Fmdlz to zero.

According to this method, the action for converging a positional error of a predetermined part, such as the body 3, of the robot 1 (the difference between an estimated position and a desired position) or an total center-of-gravity positional error of the robot 1 (the difference between an estimated total center-of-gravity position and a desired total center-of-gravity position) to zero will be weaker, as compared with the aforesaid embodiments. As previously described, however, the compliance control compensating vertical floor reaction force Fcmpnz can be reduced to zero by at least desired floor leaving time (the time at which a floating period is expected to start) by setting the permissible range of Fcmpnz as shown in FIG. 12 (c) and (d), or by setting the gain related to Fcmpnz as shown in FIG. 14 (c). Therefore, the leg 2 to be leaving a floor no longer continues kicking a floor after desired floor leaving time, thus making it possible to prevent interference with the floor before the leg 2 starts to swing.

The technology for determining Fcmpnz to control the robot 1, as described above, represents an embodiment of the twenty-seventh invention and the twenty-eighth invention of the present invention.

In the self position/posture estimator 216, an estimated body position/posture may alternatively be determined by kinematics calculation on the basis of at least a joint displacement of a desired gait and a compliance compensation amount (refer to Japanese Unexamined Patent Publication Application No. 10-277969 previously proposed by the present applicant). This will further improve the accuracy of an estimated body position, so that an actual position/posture trajectory of the foot 22 of the robot 1 accurately follows a desired foot position/posture trajectory.

Alternatively, an estimated body position/posture may be determined by kinematics calculation on the basis of at least an actual joint displacement (a detected value of a joint displacement). This will further improve the accuracy of an estimated body position, thus making an actual position/posture trajectory of the foot 22 of the robot 1 accurately follow a desired foot position/posture trajectory.

In the second embodiment, the model vertical external force Fmdlz may be virtually added. This will further improve stability.

As in the third embodiment, a floor surface shape recognizing sensor (distance sensor) for contactlessly measuring the height of a floor surface may be provided so as to measure the floor surface height of a desired landing point (predicted landing point). If the measured height is different from an expected height, then the difference (error) in the height may be regarded as the difference between an estimated vertical body position and a desired vertical body position (vertical body positional error). Based on the difference in height, the model vertical external force Fmdlz may be virtually added to a dynamic model such that the difference between a vertical body position trajectory and a desired vertical position trajectory of the actual robot 1 is converged to zero (such that the vertical body positional error, including the difference in height, is converged to zero), as in the first embodiment. Alternatively, based on the difference in height, the desired vertical body position trajectory may be corrected so as to converge it to a future vertical body position trajectory of the actual robot 1, as in the second embodiment. The technology for manipulating the model vertical external force Fmdlz and correcting the desired vertical body position trajectory on the basis of a difference in the floor surface height described above represents an embodiment of the twenty-fifth invention of the present invention.

If, however, a predicted landing point is considerably lower than an expected height, then using this control method causes the relative distance of either one of the feet 22 from the body 3 to increase. This means that all legs 2 will stretch, so that the foot 22L or 22R, which is not the foot 22R or 22L landing at a desired landing point, may be caught on a floor.

The gait generator 200 may produce corrected desired gaits and original gaits before correction, and a combination of the model vertical external force Fmdlz and the compliance control compensating vertical floor reaction force Fcmpnz may be determined such that a corrected desired gait converges to an original gait within a possible range (the compliance control compensating vertical floor reaction force Fcmpnz not exceeding a permissible range defined by a minimum permissible value and a maximum permissible value) in the vertical body position stabilizing control calculation unit 218. The corrected desired gait refers to the desired gait in which an instantaneous value is determined in S032 of FIG. 15 (the desired gait lastly output by the gait generator 200), and the gait before correction refers to a gait determined in S032, the model vertical external force Fmdlz being zero.

A fourth embodiment will now be explained. For example, a required model restoring vertical external force Fmdlrecz necessary for a corrected desired gait to converge to an original gait is determined by the following expression 4.

$Fmdlrecz = Kr*$(Vertical body position of a corrected desired gait−Vertical body position of an original gait)$+Kdr*$(Vertical body velocity of the corrected desired gait−Vertical body velocity of the original gait)   Expression 4

In other words, the required model restoring vertical external force Fmdlrecz is determined by a feedback control law (PD control law in this example) from the difference between a vertical body position of the corrected desired gait and the vertical body position of the original gait. A difference in the total center-of-gravity vertical position of the robot 1 may be used in place of the difference between the vertical body position of a desired gait and that of an original gait.

Subsequently, according to the block diagram shown in FIG. 20, a combination of the model vertical external force Fmdlz and the compliance control compensating vertical floor reaction force Fcmpnz is determined.

In other words, as described above, a minimum permissible value and a maximum permissible value for the compliance control compensating vertical floor reaction force Fcmpnz are set, and the sum of a total required vertical restoring force Fdmdz and the required model restoring vertical external force Fmdlrecz is passed through a saturation means (limiter) 250 that provides limitation using the minimum permissible value as a lower limit and the maximum permissible value as an upper limit, as illustrated in FIG. 20. Thus, the compliance control compensating vertical floor reaction force Fcmpnz is determined. The total required vertical restoring force Fdmdz is determined as explained in the first embodiment. The total required vertical restoring force Fdmdz is subtracted from the determined compliance control compensating vertical floor reaction force Fcmpnz to determine the model vertical external force Fmdlz.

In the fourth embodiment, a minimum permissible value and a maximum permissible value of the compliance control compensating vertical floor reaction force Fcmpnz are set in the same manner as that in the first embodiment. Thus, the model vertical external force Fmdlz is determined so that the vertical body positional error Δh is close to zero in a floating period, while a combination of the model vertical external force Fmdlz and the compliance control compensating vertical floor reaction force Fcmpnz is determined such that the vertical body positional error Δh and the difference between the vertical body position of a corrected desired gait and the vertical body position of an original gait are both close to zero in a supporting leg period. More detailedly, in the supporting leg period, Fcmpnz is determined such that the vertical body positional error Δh and the difference between the vertical body position of the corrected desired gait and the vertical body position of the original gait are both compromisingly brought close to zero as long as the sum of the total required vertical restoring force Fdmdz and the required model restoring vertical external force Fmdlrecz takes a value in the permissible range defined by the minimum permissible value and the maximum permissible value of the compliance control compensating vertical floor reaction force Fcmpnz. Meanwhile, the model vertical external force Fmdlz is determined so as to bring the difference between the vertical body position of the corrected desired gait and the vertical body position of the original gait close to zero.

The fourth embodiment explained above is an embodiment of the eighteenth invention and the nineteenth invention of the present invention.

According to the embodiments of the present invention, the difference between an actual vertical body position trajectory and a desired vertical body position trajectory of the robot 1 or a vertical position trajectory of an actual total center of gravity and a vertical position trajectory of an total center of gravity of a desired gait converge (gradually approach) to zero, while an actual joint displacement of the robot 1 is controlled so as to follow a joint displacement of a desired gait generated by a dynamic model. Hence, in a global space, an actual foot trajectory of the robot 1 converges to a desired foot trajectory. Thus, as observed from the global space (a coordinate system fixed to a floor), an actual robot motion and a floor reaction force always substantially agree with the motion and the floor reaction force of a desired gait (accurate follow-up control).

This arrangement improves the posture stability of the robot 1 and prevents excessive floor reaction forces or impacts from being produced.

As a result, an actual floor leaving timing substantially agrees with a floor leaving timing of a desired gait, solving a problem of a slippage or a spin and a free leg foot being caught on a floor due to a shifted timing for leaving a floor.

Regarding the landing, as observed from the global space, the foot position and the velocity of the actual robot 1 at landing substantially agree with a desired positional velocity. Hence, an actual landing timing substantially agrees with a landing timing of a desired gait, and the ground velocity at landing is controlled properly (e.g., zero), leading to a reduced landing impact. In particular, a desired foot trajectory is set so that the ground velocity at landing becomes zero or substantially zero, leading to a further reduced landing impact.

Complementarily, a foot trajectory is described in terms of a global coordinate system (space), so that the relative positions of the body 3 and the foot 22 change when the vertical body position is corrected as in the above embodiments. As a result, extension or contraction of the leg 2 happens (the knee stretches or bends). This action, however, is different from a mere correction of a trajectory of the foot 22. For example, if the foot trajectory is simply corrected so that the ground velocity at landing will be zero when a vertical body position trajectory of the actual robot 1 in a floating period deviates from the vertical body position trajectory of a desired gait, then a state of the actual robot 1 and a state of a dynamic model for generating a desired gait do not agree with each other and posture stability may be impaired after landing, because the vertical body position trajectory of the actual robot 1 remains shifted from the vertical body position trajectory of the dynamic model for generating a desired gait, although a landing impact is reduced. Especially if a state amount related to velocity, such as a center of gravity vertical velocity, disagrees, then posture stability may be significantly impaired after landing.

INDUSTRIAL APPLICABILITY

As described above, the present invention is useful for enabling a legged mobile robot, such as a bipedal mobile robot, to perform smooth motions when the robot runs or jumps.

The invention claimed is:

1. A control device of a legged mobile robot adapted to generate a desired gait of a legged mobile robot that moves by motions of its legs and to control an operation of the robot so that the robot follows the desired gait, the control device comprising:

a desired gait generator adapted to generate a desired gait, wherein the desired gait includes at least a desired motion of the robot and has a floating period during which all legs of the robot float in the air, and having a desired trajectory;

a self position estimator adapted to take the position of a predetermined part of the robot or the position of the center of gravity of the robot as a representative self position of the robot, and then estimate a component in the predetermined direction of the representative self position as indicative of an actual state amount of the robot related to a translational motion in the predetermined direction of the robot;

a state amount error calculator adapted to calculate a state amount error, wherein the state amount error is a difference between a component in the predetermined direction of the estimated representative self position and a component of the predetermined direction of the representative self position of the desired gait; and a predicted trajectory calculator adapted to determine a predicted trajectory of a component in a predetermined direction of the representative self position at least during the floating period on the basis of a component in a predetermined direction of the representative self position estimated by the self position estimator at least before the floating period begins, wherein the desired gait generator adjusts the desired motion of the desired gait in the floating period on the basis of the state amount error such that the desired trajectory of the component in the predetermined direction of the representative self position defined by the desired gait in the floating period approaches the predicted trajectory at least before an end of the floating period, wherein the adjustment of the desired gait is made during the floating period.

2. A control device of a legged mobile robot adapted to generate a desired gait of the legged mobile robot that moves by motions of its legs and to control an operation of the robot so that the robot follows the desired gait, the control device comprising:

a desired gait generator adapted to generate a desired gait, wherein the desired gait includes at least a desired motion of the robot and has a floor reaction force non-acting period during which a floor reaction force acting on the robot is maintained substantially at zero; and a state amount error calculator adapted to calculate a state amount error, wherein the state amount error is a difference between a state amount of the desired gait related to a translational motion in a predetermined direction of the robot and an actual state amount of the robot related to the translational motion in the predetermined direction, wherein the desired gait generator adjusts the desired motion of the desired gait of the robot so as to bring the state amount error close to zero on the basis of the state amount error during the floor reaction force non-acting period, wherein the desired gait generator adjusts the desired gait of the robot during the floor reaction force non-acting period.

3. The control device of a legged mobile robot according to claim 2, wherein the desired gait generator is adapted to determine the desired motion by using a dynamic model while inputting at least a reference floor reaction force as a desired value of a floor reaction force to be applied to the robot into the dynamic model indicating a relationship between a force acting on the robot and a motion of the robot, and a virtual external force is determined on the basis of at least the state amount error, and the virtual external force is additionally input to the dynamic model thereby to determine the desired motion.

4. The control device of a legged mobile robot according to claim 3, wherein the desired gait generator is adapted to determine a manipulated variable of an external force to be additionally input to the dynamic model in order to bring the state amount error close to zero on the basis of the state amount error according to a feedback control law, wherein if a value of the manipulated variable of the external force exists in a predetermined dead zone including zero, then the virtual external force is determined to be zero, or if the value of the manipulated variable of the external force is out of the dead zone, then the virtual external force is determined to be a value equivalent to the deviation of the manipulated variable of the external force from the dead zone.

5. The control device of a legged mobile robot according to claim 3,
wherein the reference floor reaction force has a floor reaction force non-acting period and the value of the floor reaction force is maintained substantially at zero, and
the desired gait generator is adapted to determine the virtual external force to be substantially zero in periods other than the floor reaction force non-acting period.

6. The control device of a legged mobile robot according to claim 5, wherein the desired gait generator is adapted to determine the desired motion so as to bring the desired motion close to a reference motion that balances out the reference floor reaction force on the dynamic model at least in a period during which the virtual external force is determined to be substantially zero.

7. The control device of a legged mobile robot according to claim 3, wherein the desired gait generator is adapted to determine, at least on the basis of the reference floor reaction force, a desired floor reaction force of a robot that will be imbalanced with the desired motion on the dynamic model, and the control device comprises a compliance controller adapted to operate the robot to make a gait of the robot follow the desired motion and the desired floor reaction force.

8. The control device of a legged mobile robot according to claim 7, wherein the desired gait generator is adapted to determine, at least on the basis of the state amount error, the desired floor reaction force such that the state amount error is brought close to zero.

9. The control device of a legged mobile robot according to claim 2, wherein the desired gait generator adjusts the desired motion such that the desired motion is brought close to the predetermined reference motion at least in the periods other than the floor reaction force non-acting period, wherein the predetermined reference motion is a predetermined motion model of the robot.

10. The control device of a legged mobile robot according to claim 2, wherein the desired gait generator is adapted to determine a desired floor reaction force of the robot, and the control device comprises a compliance controller adapted to operate the robot to make a gait of the robot follow the desired motion and the desired floor reaction force.

11. The control device of a legged mobile robot according to claim 10, wherein the desired gait generator is adapted to determine, at least on the basis of the state amount error, the desired floor reaction force such that the state amount error is brought close to zero.

12. The control device of a legged mobile robot according to claim 2, wherein the state amount is a position of a predetermined part of the robot or a position of the center of gravity of the robot.

13. The control device of a legged mobile robot according to claim 12, wherein the predetermined part is a body of the robot.

14. A control device of a legged mobile robot, comprising a desired gait generator adapted to generate a desired gait formed of a desired motion and a desired floor reaction force of a legged mobile robot, which moves by motions of its legs; a compliance controller adapted to operate the robot such that a gait of the robot follows a desired motion and a desired floor reaction force of the desired gait; and
a state amount error calculator adapted to determine, as a state amount error, the difference between a state amount of the desired gait related to a translational motion in a vertical direction of the robot and an actual state amount of the robot related to the translational motion in the vertical direction,
wherein the desired gait generator is adapted to adjust a combination of a desired motion and a translational force vertical component of a desired floor reaction force of the robot such that the state amount error is brought close to zero on the basis of at least the state amount error.

15. The control device of a legged mobile robot according to claim 14, wherein the desired gait generator is adapted to determine the desired motion by using a dynamic model while inputting at least a reference floor reaction force as a reference desired value of a translational force vertical component of a floor reaction force to be applied to the robot into the dynamic model indicating a relationship between a floor reaction force acting on the robot and a motion of the robot, and
the desired gait generator is adapted to determine on the basis of at least the state amount error a combination of a virtual external force to be additionally input to the dynamic model and a desired floor reaction force correction amount as a correction amount of the desired floor reaction force based on the reference floor reaction force of a translational force vertical component of the desired floor reaction force, and the determined virtual external force is additionally input to the dynamic model thereby to determine the desired motion, and the reference floor reaction force is corrected using the desired floor reaction force correction amount so as to determine a translational force vertical component of the desired floor reaction force.

16. The control device of a legged mobile robot according to claim 15, wherein the desired gait generator is adapted to determine a desired value of a difference between the desired floor reaction force correction amount and the virtual external force on the basis of the state amount error so as to bring the state amount error close to zero, and then determines a combination of the desired floor reaction force correction amount and the virtual external force such that the determined desired value of the difference is satisfied.

17. The control device of a legged mobile robot according to claim 16, wherein the desired gait generator is adapted to determine a permissible range of the desired floor reaction force correction amount, and determines a combination of the desired floor reaction force correction amount and a virtual external force that result in the desired value of the difference and the permissible range of the desired floor reaction force correction amount.

18. The control device of a legged mobile robot according to claim 17, wherein the desired gait generator is adapted to determine:
a preliminary value of the desired floor reaction force correction amount on the assumption that the desired virtual external force corresponding to the desired value of the difference is zero;
a desired floor reaction force correction amount obtained by limiting the preliminary value to a value within the permissible range on the basis of the preliminary value of the desired floor reaction force correction amount and the permissible range; and
the virtual external force on the basis of the determined desired floor reaction force correction amount and the determined desired value of the difference.

19. The control device of a legged mobile robot according to claim 17, wherein the desired gait is a gait having a period during which all legs of the robot float in the air, and a permissible range of the desired floor reaction force correction amount is determined to be in a range such that an upper limit value and a lower limit value of the permissible range are substantially zero at least in the floating period.

20. The control device of a legged mobile robot according to claim 16, wherein the desired gait generator is adapted to determine a combination of the desired floor reaction force correction amount and a virtual external force that will bring the desired motion close to a reference motion balancing with the reference floor reaction force on the dynamic model while satisfying the desired value of the difference at the same time.

21. The control device of a legged mobile robot according to claim 20, wherein the desired gait generator is adapted to:
    determine a first floor reaction force manipulated variable according to a feedback control law for bringing the state amount error close to zero;
    determine a second floor reaction force manipulated variable according to a feedback control law for bringing the desired motion close to a reference motion balancing with the reference floor reaction force on the dynamic model;
    determine a permissible range of the desired floor reaction force correction amount;
    take a floor reaction force manipulated variable obtained by combining the first floor reaction force manipulated variable and the second floor reaction force manipulated variable as a preliminary value of the desired floor reaction force correction amount and then to determine a desired floor reaction force correction amount by limiting the preliminary value to the desired permissible range; and
    determine the virtual external force such that a difference between the desired floor reaction force correction amount and the virtual external force agrees with the first floor reaction force manipulated variable.

22. The control device of a legged mobile robot according to claim 14, wherein the state amount is a position of a predetermined part of the robot or a position of the center of gravity of the robot.

23. The control device of a legged mobile robot according to claim 22, wherein the predetermined part is a body of the robot.

24. A control device of a legged mobile robot adapted to generate a desired gait of a legged mobile robot that moves by motions of its legs and to control an operation of the robot so that the robot follows the desired gait, comprising:
    a desired gait generator adapted to generate the desired gait;
    a self position estimator adapted to take at least one of the position of a predetermined part of the robot and the position of the center of gravity of the robot as a representative self position of the robot so as to estimate the representative self position;
    a positional error calculator adapted to determine, as a predetermined direction positional error, a component in a predetermined direction in a difference between the estimated representative self position and a representative self position in the desired gait; and
    a floor shape recognizer adapted to measure a vertical position of an expected landing point on a floor where a distal portion of a leg, which performs landing operation of the robot, is expected to actually land according to a desired landing point in the desired gait,
    wherein the desired gait generator corrects the desired gait on the basis of at least the predetermined direction positional error determined by the positional error calculator and the vertical position of the expected landing point measured by the floor shape recognizer.

25. The control device of a legged mobile robot according to claim 24, wherein the desired gait generator is adapted to correct a desired motion defining a trajectory of the representative self position in the desired gait on the basis of at least the predetermined direction positional error such that the predetermined direction positional error approaches zero; and to correct a desired motion defining a trajectory of a distal portion of a leg in the desired gait on the basis of at least a vertical position of the expected landing point that has been measured.

26. The control device of a legged mobile robot according to claim 24, wherein, based on at least a difference between the vertical position of the expected landing point that has been measured and the vertical position of the desired landing point in the desired gait, and the predetermined direction positional error, the desired gait generator is adapted to correct a desired motion defining a trajectory of the representative self position in the desired gait so that the above difference and error approach zero.

27. A control device of a legged mobile robot comprising a compliance controller adapted to control an operation of a robot so that the robot follows a desired gait composed of a desired motion of a legged mobile robot that moves by motions of its legs and a desired floor reaction force, the compliance controller grasping a floor reaction force actually acting on the robot and correcting, from a relative position defined by the desired motion, a relative position of a distal portion of a leg in relation to a body of the robot on the basis of a floor reaction force error, which is a difference between the grasped floor reaction force and the desired floor reaction force,
    wherein the desired gait is a gait having a floating period in which all legs of the robot float in the air, and the compliance controller reduces a gain of a correction amount of the relative position of the distal portion of the leg relative to the floor reaction force error at least immediately before the floating period.

28. A control device of a legged mobile robot adapted to generate a desired gait that includes at least a desired motion of a legged mobile robot that moves by motions of its legs, and to control an operation of the robot so that the robot follows the desired gait, the control device comprising:
    a desired gait generator adapted to generate the desired gait including at least a floating period in which all legs of the robot float in the air;
    a self position estimator adapted to take at least one of the position of a predetermined part of the robot and the position of the center of gravity of the robot as a representative self position of the robot so as to estimate the representative self position;
    a positional error calculator adapted to determine, as a predetermined direction positional error, a component in a predetermined direction of a difference between the estimated representative self position and a representative self position in the desired gait; and
    a leg distal portion position corrector adapted to correct the position of a distal portion of a leg of the robot on the basis of a position defined by the desired gait so as to bring the predetermined direction positional error close to zero on the basis of at least the predetermined direction positional error,
    wherein the leg distal portion position corrector forcibly sets a correction amount of the position of the distal end portion of the leg to substantially zero regardless of the predetermined direction positional error at least by the time the floating period of the desired gait begins.

29. A control device of a legged mobile robot adapted to generate a desired gait composed of a desired motion and a desired floor reaction force of a legged mobile robot that moves by motions of its legs, and to control an operation of the robot so that the robot follows the desired gait, the control device comprising:

- a desired gait generator adapted to generate the desired gait including at least a floating period in which all legs of the robot float in the air;
- a self position estimator adapted to estimate at least one of the position of a predetermined part of the robot and the position of the center of gravity of the robot as a representative self position of the robot so as to estimate the representative self position;
- a positional error calculator adapted to determine, as a predetermined direction positional error, a component in a predetermined direction in a difference between the estimated representative self position and a representative self position in the desired gait; and
- a floor reaction force corrector adapted to correct a desired floor reaction force in the desired gait so as to bring the predetermined direction positional error close to zero on the basis of at least the predetermined direction positional error, wherein the floor reaction force corrector is adapted to forcibly set a correction amount of the desired floor reaction force to substantially zero regardless of the predetermined direction positional error at least by the time the floating period of the desired gait begins.

* * * * *